(12) United States Patent
Takehana

(10) Patent No.: US 8,641,199 B2
(45) Date of Patent: Feb. 4, 2014

(54) PROJECTOR

(75) Inventor: Naoto Takehana, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 340 days.

(21) Appl. No.: 13/219,918

(22) Filed: Aug. 29, 2011

(65) Prior Publication Data

US 2012/0062853 A1    Mar. 15, 2012

(30) Foreign Application Priority Data

Sep. 10, 2010  (JP) .................................. 2010-203082
Sep. 10, 2010  (JP) .................................. 2010-203083

(51) Int. Cl.
*G03B 21/14*    (2006.01)
*G03B 21/16*    (2006.01)
*G03B 21/18*    (2006.01)
*G03B 21/22*    (2006.01)
*B60Q 1/06*    (2006.01)
*F21V 29/00*    (2006.01)

(52) U.S. Cl.
USPC ............... 353/52; 353/61; 353/119; 362/294; 362/373

(58) Field of Classification Search
USPC .......... 353/52, 55–61, 94, 119; 362/294, 345, 362/373
See application file for complete search history.

(56) References Cited

U.S. PATENT DOCUMENTS

| | | | | |
|---|---|---|---|---|
| 3,203,338 A | * | 8/1965 | Dry | ................................ 454/318 |
| 5,850,742 A | * | 12/1998 | Bang et al. | ......................... 62/89 |
| 6,955,434 B2 | | 10/2005 | Hsu | |
| 7,000,411 B2 | * | 2/2006 | Kim et al. | ........................ 62/183 |
| 7,543,942 B2 | | 6/2009 | Yoo | |
| 7,674,165 B2 | * | 3/2010 | Lu et al. | ......................... 454/184 |
| 8,393,739 B2 | * | 3/2013 | Chien et al. | ..................... 353/61 |
| 8,419,515 B1 | * | 4/2013 | Dillon | ............................ 454/284 |
| 8,465,156 B2 | * | 6/2013 | Nakashita | ........................ 353/58 |
| 2012/0044463 A1 | * | 2/2012 | Takehana | ........................ 353/52 |

FOREIGN PATENT DOCUMENTS

| | | |
|---|---|---|
| JP | 6-235905 A | 8/1994 |
| JP | 3453775 B | 10/2003 |
| JP | 2003-315910 A | 11/2003 |
| JP | 2004-233796 A | 8/2004 |
| JP | 2008-542813 A | 11/2008 |
| JP | 2009-98481 A | 5/2009 |

\* cited by examiner

*Primary Examiner* — Tony Ko
*Assistant Examiner* — Jori S Reilly-Diakun
(74) *Attorney, Agent, or Firm* — ALG Intellectual Property, LLC

(57) ABSTRACT

A projector includes an outer housing having an exhaust port, a louver board configured to rotate to an open position in which the louver board opens the exhaust port or to a close position in which the louver board closes the exhaust port, and a drive mechanism configured to rotate the louver board and includes a moving member that rotates the louver board to the open position or the close position by moving rectilinearly. The louver board includes a projecting section configured to engage the moving member. The positions of the projecting section in the open position and in the close position are set so as to be located on opposite sides of a virtual plane which includes a rotation axis of the louver board and is perpendicular to a direction in which the moving member moves.

16 Claims, 16 Drawing Sheets

PROJECTOR

CROSS-REFERENCE

The entire disclosure of Japanese Patent Application No. 2010-203082 filed Sep. 10, 2010 and No. 2010-203083 filed Sep. 10, 2010 is expressly incorporated by reference herein.

BACKGROUND

1. Technical Field

The present invention relates to projectors.

2. Related Art

In the past, the configuration of a projector in which, in an exhaust port formed in an outer housing, a plurality of louver boards (louvers) for opening and closing the exhaust port are provided has been proposed (for example, JP-A-2003-315910 (Patent Document 1)).

In a projector (a projecting device) of Patent Document 1, a structure (hereinafter an "opening and closing structure") in which a plurality of louver boards are rotatably attached to an outer housing (an outer part) and an exhaust port can be opened and closed by rotating the louver boards is adopted.

Specifically, the opening and closing structure includes an arm which has the shape of an long flat plate and moves rectilinearly in a longitudinal direction. Moreover, each of the plurality of louver boards is provided with a louver guide shaft which is parallel to a louver rotation axis. The louver guide shafts are inserted in long holes (arm guiding holes) formed in the arm.

A force is exerted on each louver guide shaft at an inner edge of each long hole by moving the arm rectilinearly in a longitudinal direction, whereby the louver boards are rotated at once.

However, in the projector of Patent Document 1, the positions of the louver guide shaft in a close position in which the exhaust port is closed by the louver boards and in an open position in which the exhaust port is opened by the louver boards are not set so as to be located on opposite sides of a virtual plane which includes the rotation axis of the louver board and is perpendicular to a direction in which the arm moves (a longitudinal direction).

That is, when the louver board is rotated from the open position to the close position or rotated from the close position to the open position, the louver guide shaft moves in an arc so as to intersect with the direction in which the arm moves.

As a result, a somewhat great force is required to move the arm (rotate the louver boards) and a great driving force is required to open and close the exhaust port smoothly by rotating the louver boards, which is a first problem.

Moreover, in the projector of Patent Document 1, even when the exhaust port is closed by rotating the louver boards, the louver boards sway due to a gap etc. between each long hole formed in the arm and the louver guide shaft, making it difficult to keep a state in which the exhaust port is closed, which is a second problem.

SUMMARY

An advantage of some aspects of the invention is to provide a projector that can open and close an exhaust port smoothly while controlling a driving force.

Another advantage of some aspects of the invention is to provide a projector that can keep a closed state of the exhaust port.

A projector according to an aspect of the invention includes: an outer housing having an exhaust port; a louver board configured to rotate to an open position in which the louver board opens the exhaust port or to a close position in which the louver board closes the exhaust port; and a drive mechanism configured to rotate the louver board, and includes a moving member configured to rotate the louver board to the open position or the close position by moving rectilinearly, the louver board includes a projecting section configured to engage the moving member, and the positions of the projecting section in the open position and in the close position are set so as to be located on opposite sides of a virtual plane which includes a rotation axis of the louver board and is perpendicular to a direction in which the moving member moves.

In this aspect of the invention, the moving member rotates the louver board to the open position or the close position by moving rectilinearly and thereby exerting a force on the projecting section.

Here, the positions of the projecting section in the open position and in the close position are set so as to be located on opposite sides of the virtual plane which includes the rotation axis of the louver board and is perpendicular to the direction in which the moving member moves.

As a result, when the louver board rotates from the open position to the close position or rotates from the close position to the open position, as compared to a case in which the positions of the projecting section in the open position and in the close position are not located on opposite sides of the virtual plane which includes the rotation axis of the louver board and is perpendicular to the direction in which the moving member moves, the projecting section moves along the direction in which the moving member moves.

This makes it possible to transmit the force that moves the moving member efficiently to the projecting section (the louver board), eliminates the need for a great force to move the moving member (rotate the louver board), and makes it possible to open and close the exhaust port smoothly while controlling a driving force. That is, this is the advantage described above.

In the projector according to the aspect of the invention, it is preferable that the positions of the projecting section in the open position and in the close position be set so as to be symmetric with respect to the virtual plane.

By setting the positions in this manner, it is possible to move the projecting section more efficiently in the direction in which the moving member moves.

In the projector according to the aspect of the invention, it is preferable that the drive mechanism include a solenoid configured to operate the moving member.

According to this configuration, by operating the moving member with the solenoid, it is possible to move the moving member rectilinearly by directly using the rectilinear motion of the solenoid, and there is no need to use an intermediate member such as a gear between the solenoid and the moving member.

Therefore, as compared to a case in which the moving member is operated by a motor or the like, the structure of the drive mechanism can be simplified. Moreover, as compared to a case in which a motor or the like is used as a component element, it is possible to reduce power consumption.

In the projector according to the aspect of the invention, it is preferable that the solenoid be formed as a self-holding solenoid configured to perform sucking operation for sucking a movable member and making the movable member stick to a fixed member by the passage of electric current through an exciting coil and then keeps a state in which the movable member is sucked and made to stick to the fixed member only by magnetomotive force of a permanent magnet.

According to this configuration, by forming the solenoid as a self-holding solenoid, it is possible to keep a suction state even when current is not always passed through the exciting coil and keep the position of the louver board.

Therefore, as compared to a case in which the solenoid is formed as another solenoid that is not a self-holding solenoid, it is possible to reduce power consumption even further.

In the projector according to the aspect of the invention, it is preferable that the solenoid rotate the louver board to the open position with the sucking operation and rotate the louver board to the close position with a restoring operation that makes the movable member detachable from the fixed member by cancelling out the magnetomotive force of the permanent magnet by the passage of electric current through the exciting coil.

Incidentally, a projector having the function of ending the driving normally even when the power supply from the outside is suddenly interrupted as a result of a power plug being pulled while the projector is used has been known. In this projector, when the power supply from the outside is interrupted, the driving is stopped completely after operation necessary for terminating the driving is performed by using a standby power supply, such as a capacitor, incorporated in the projector.

In addition, when the above-described solenoid is adopted in the projector having the function described above, the louver board can be switched from the open position to the close position by operating the solenoid by using the power of the capacitor after the power supply from the outside is interrupted. This makes it possible to switch the louver board to the close position by driving the solenoid by using the capacitor even when the power supply from the outside is suddenly interrupted. At this time, in the self-holding solenoid, since a larger current is usually applied to the exciting coil in the sucking operation than in the restoring operation, when a configuration in which the louver board is rotated to the close position with the sucking operation is adopted, a capacitor that can supply a relatively large current according to the sucking operation is necessary.

According to this configuration, since the louver board is rotated to the close position with the restoring operation, it is possible to reduce power consumption and, when the solenoid is driven by the capacitor, it is possible to drive the solenoid by a lower-capacity and low-cost capacitor.

In this aspect of the invention, it is preferable that the louver board includes a pair of extending sections extending from the rotation axis in opposite directions and has a shape which is rotationally symmetric about the rotation axis.

Here, when there is only one extending section extending from the rotation axis, the center of gravity of the louver board is off the rotation axis (in a position away from the rotation axis in a direction in which the extending section extends). When such a louver board is adopted, if the position of the projector is changed to change the angle of projection (the projection position) of the projector, for example, the louver board easily moves because the center of gravity is located at the edge of the louver board. As a result, there is a possibility that the rotational position of the louver board is moved from an intended position.

According to this aspect of the invention, since the louver board has a shape which is rotationally symmetric about the rotation axis and is formed of the pair of extending sections extending from the rotation axis in opposite directions, the center of gravity of the louver board is located on the rotation axis. As a result, even when the position of the projector is changed according to the angle of projection or the like, there is no possibility that the rotational position of the louver board is moved from an intended position.

A projector according to another aspect of the invention includes: an outer housing having an exhaust port; a louver board configured to rotate about a rotation axis to an open position in which the louver board opens the exhaust port or to a close position in which the louver board closes the exhaust port; a drive mechanism configured to operate the louver board; a supporting member configured to pivotally support the louver board; and an engagement structure provided in the louver board and the supporting member, the engagement structure includes an engaging section formed in the louver board and a locking section formed in the supporting member, the engaging section and the locking section engaging in the close position.

In this aspect of the invention, when the louver board rotates to the close position, the louver board and the supporting member engage by the engagement structure. This makes it possible to prevent the sway of the louver board in the close position and keep a closed state of the exhaust port. That is, this is the other advantage described above.

In the projector according to this aspect of the invention, it is preferable that the engagement structure includes the locking section so that the louver board and the supporting member engage also in the open position.

Here, even after the louver board is rotated to the open position, as is the case with the close position described above, the louver board sways. As described above, when the louver board sways, if there is leak light from the exhaust port (leak light from a light source in the projector), there is a possibility that the leak light fluctuates due to the sway of the louver board and flicker occurs due to the fluctuation of the leak light when the projector is used.

In this aspect of the invention, when the louver board rotates to the open position, the louver board and the supporting member engage by the engagement structure. This makes it possible to prevent the sway of the louver board in the open position. As a result, even when there is leak light from the exhaust port, it is possible to prevent the fluctuation of the leak light and prevent the occurrence of flicker.

In the projector according to this aspect of the invention, it is preferable that the louver board includes an extending section extending from the rotation axis, and the engagement structure is provided in an edge side of the extending section.

Here, the louver board in a locked position of the engaging section and the locking section is supported by the supporting member in a rotation axis portion (a portion in which the lover board is pivotally supported by the supporting member) and an engagement structure portion. As a result, when the distance from the rotation axis to the engagement structure is short, it is difficult to hold the louver board with stability.

In this aspect of the invention, since the engagement structure is provided in an edge side of the extending section, the edge which is away from the rotation axis, as compared to a case in which the engagement structure is provided in a position near the rotation axis, it is possible to hold the louver board with stability.

In the projector according to this aspect of the invention, it is preferable that the louver board includes an end section located at an end of the extending section in a vertical direction thereof, the supporting member includes a flat section facing the end section with a gap between the flat section and the end section, the engaging section projects from the end section to the flat section, and the projection length of the engaging section is smaller than the gap.

In this aspect of the invention, since the projection length of the engaging section is smaller than the gap between the end section and the flat section, the engaging section and the flat section do not make contact with each other when the louver board is rotating. This eliminates frictional resistance between the engaging section and the flat section when the louver board is rotated, and makes it possible to rotate the louver board smoothly with a weak force as compared to a structure in which the engaging section and the flat section make contact with each other.

In the projector according to this aspect of the invention, it is preferable that the louver board is pivotally supported with play in a direction along the rotation axis, the locking section is formed into a projecting shape projecting from the flat section to the engaging section and having a concave section configured to engage the engaging section at a tip thereof, and the length of the play is greater than the distance from a point of the engaging section to the tip of the locking section in a direction in which the engaging section projects in a state in which the louver board has moved to a lower end.

Here, if the louver board is supported by the supporting member without play, it is necessary to deform the louver board by applying a load to the louver board in order to engage the engaging section in the concave section.

In this aspect of the invention, since the play allows the louver board to move along the rotation axis and the locking section is located below the engaging section, the louver board moves downward and the play is reduced. As a result, when the louver board is rotated to the locked position, the engaging section abuts the locking section. However, the length of the play in the direction of the rotation axis of the louver board is made longer than the distance from the point of the engaging section to the tip of the locking section in the direction in which the engaging section projects in a state in which the louver board has been moved downward. As a result, by moving the louver board upward, it is possible to engage the engaging section in the concave section at the tip of the locking section. This makes it possible to engage the engaging section without deforming the louver board by applying a load thereto.

Moreover, in the projector according to this aspect of the invention, it is preferable that the louver board is pivotally supported with play in a direction along the rotation axis, the locking section is formed into a projecting shape projecting from the flat section to the engaging section and having a concave section configured to engage the engaging section at a tip thereof, the gap is a gap between the end section and the flat section in a state in which the louver board has moved to a lower end, and the gap be smaller than a length which is the sum of the projection length of the engaging section and a length from a point of the engaging section to the flat section in a locked position of the engaging section and the locking section.

In this aspect of the invention, the gap between the end section and the flat section in a state in which the louver board has moved downward is smaller than a length which is the sum of the projection length of the engaging section and the length from the point of the engaging section to the flat section in the locked position. As a result, in the locked position, the louver board does not move all the way downward. That is, since the engaging section is pressed against the concave section and is engaged therein under the own weight of the louver board in the locked position, it is possible to keep a good engagement state without applying a load on the louver board.

In the projector according to this aspect of the invention, it is preferable that the engaging section is provided at upper and lower ends of the end section, the locking section is provided for each of the engaging sections, and a length from a point of one engaging section to a point of the other engaging section is shorter than a length from a tip of one locking section to a tip of the other locking section.

Here, as the projector, a projector that supports installation in a stationary position (a position in which the projector is installed on an installation surface such as a desk) and installation in a ceiling-hung position (a position in which the projector is installed on a ceiling or the like in such a way that the projector in a stationary position is turned upside down) has been known.

In this aspect of the invention, in a position in which the lower end of the end section is located below the upper end of the end section (for example, in the stationary position), since the louver board is pivotally supported with play, the louver board moves downward under its own weight. As a result, in the locked position, the sway of the louver board is prevented by the engagement structure on the lower end side. Moreover, a length from the point of one engaging section to the point of the other engaging section is shorter than a length from the tip of one locking section to the tip of the other locking section. As a result, in the engagement structure on the upper end side, a gap is generated between the engaging section and the locking section.

Incidentally, in a position in which the lower end of the end section is located above the upper end of the end section (for example, in the ceiling-hung position), the sway of the louver board is prevented by the engagement structure on the upper end side, and, in the engagement structure on the lower end side, a gap is generated between the engaging section and the locking section.

Therefore, since it is possible to prevent the sway of the louver board by any one of the engagement structures on the upper end side and on the lower end side, as compared to a case in which the sway of the louver board is prevented by the engagement structures on both end sides, it is possible to bring the engaging section into engagement and make the engaging section go out of engagement by a force which is not very great.

In the projector according to this aspect of the invention, it is preferable that the louver board includes a pair of extending sections extending from the rotation axis in opposite directions and has a shape which is rotationally symmetric about the rotation axis.

Here, when there is only one extending section extending from the rotation axis, the center of gravity of the louver board is off the rotation axis (in a position away from the rotation axis in a direction in which the extending section extends). When such a louver board is adopted, if the position of the projector is changed to change the angle of projection (the projection position) of the projector, for example, the louver board easily moves because the center of gravity is located at the edge of the louver board. As a result, there is a possibility that the rotational position of the louver board is moved from an intended position.

According to this aspect of the invention, since the louver board has a shape which is rotationally symmetric about the rotation axis and is formed of the pair of extending sections extending from the rotation axis in opposite directions, the center of gravity of the louver board is located on the rotation axis. As a result, even when the position of the projector is changed according to the angle of projection or the like, there is no possibility that the rotational position of the louver board is moved from an intended position.

In the projector according to this aspect of the invention, it is preferable that the locking section has an inclined surface in a portion with which the engaging section makes contact.

In this aspect of the invention, since a portion with which the engaging section makes contact is an inclined surface, it is possible to make a load which is applied to the louver board uniform when the louver board rotates to the close position and rotate the louver board smoothly.

In the projector according to this aspect of the invention, it is preferable that the concave section is formed so as to intersect the trajectory of the engaging section, the trajectory described when the louver board is rotating.

Here, when the concave section is formed at one point on the trajectory, it is necessary to produce the louver board and the supporting member precisely so that the engaging section is engaged in the concave section in the locked position.

In this aspect of the invention, since the concave section is formed into a groove shape extending while intersecting the trajectory of the engaging section, the trajectory described when the louver board is rotating, even if the louver board and the supporting member are not produced precisely, the engaging section can be engaged in the concave section in the locked position. This makes it easier to produce the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described based on the drawings.
Appearance of a Projector FIG. 1 is a diagram showing the appearance of a projector 1.

Incidentally, in the following description, in the projector 1, a projection side (a side on which a projection lens 3C is disposed) is referred to as a "front face" and an opposite side thereof is referred to as a "back face". Moreover, an upper side (a top side) and a lower side (a bottom side) in FIG. 1 are referred to as an "upper side" and a "lower side", respectively. Furthermore, right and left sides of the projector 1 viewed from the front face are referred to as a "right side" and a "left side", respectively.

The projector 1 projects an image and displays a projected image on a screen (not shown).

Figure 1:
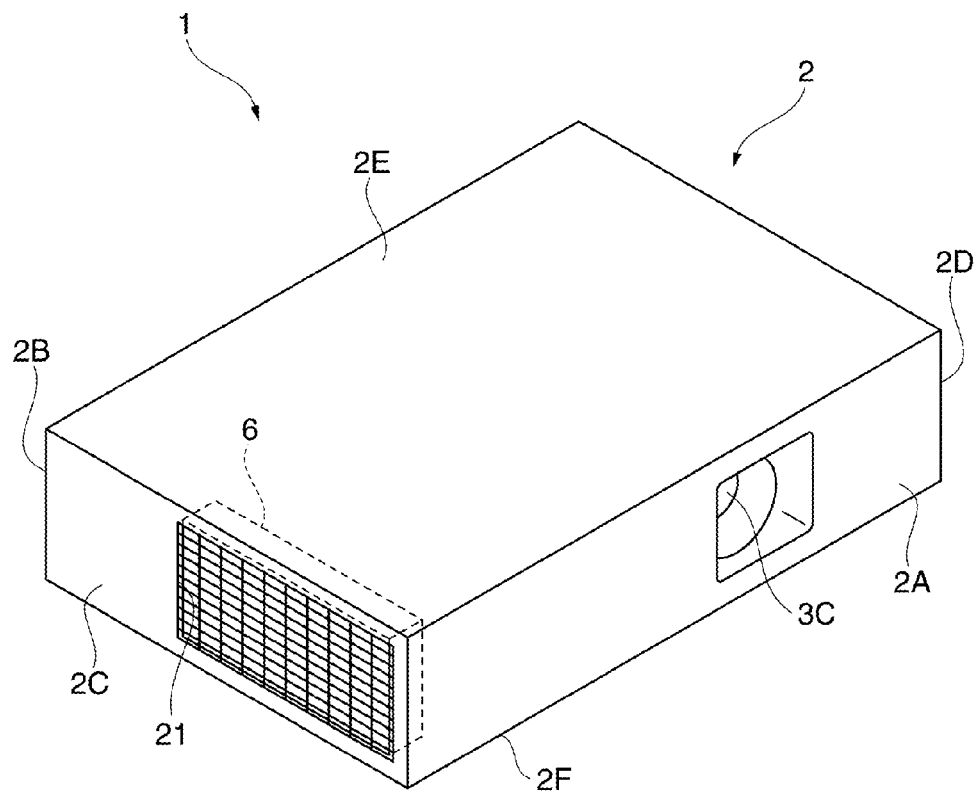
FIG. 1 is a perspective view showing the appearance of a projector according to a first embodiment of the invention.

As shown in FIG. 1, the projector 1 includes an outer housing 2 forming an outer jacket of the projector 1.

The outer housing 2 houses components forming the projector 1, and, as shown in FIG. 1, is shaped like a rectangular parallelepiped. That is, as shown in FIG. 1, the outer housing 2 includes a front wall section 2A located on the front face side, a back wall section 2B located on the back face side, a left wall section 2C and a right wall section 2D located on the left and right sides, respectively, as seen from the front face, and a top side section 2E and a bottom side section 2F connected to the wall sections 2A to 2D.

In addition, in the left wall section 2C, an exhaust port 21 for exhausting air inside the projector 1 to the outside is provided.
Internal Structure of the Projector FIG. 2 is a plan view schematically showing an internal structure of the projector 1.

Figure 2:
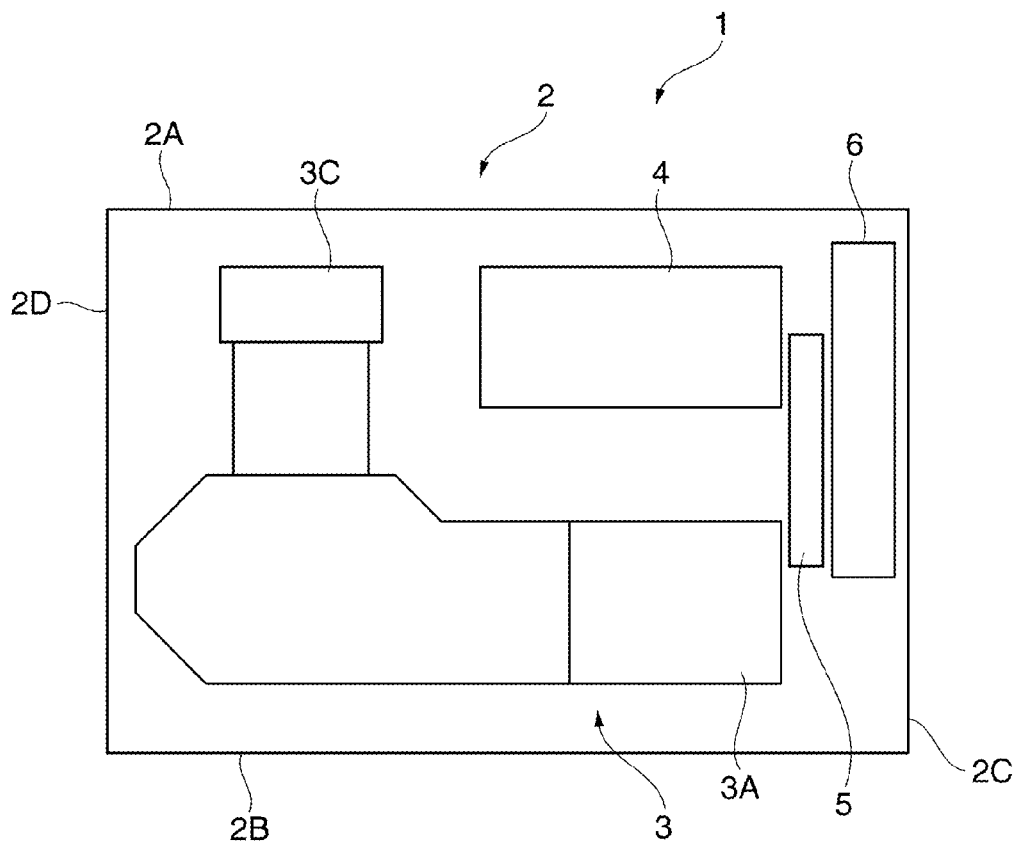
FIG. 2 is a plan view showing an internal structure of the projector in the first embodiment.

Inside the outer housing 2, as shown in FIG. 2, an optical unit 3, a power supply unit 4, an exhaust fan 5, a shutter apparatus 6, and a control unit 11 (see FIG. 9) are disposed.

As shown in FIG. 2, the optical unit 3 has a virtually L shape in a plan view, extending from a side near the left wall section 2C along the back wall section 2B and then bending to the front wall section 2A.

Since the optical unit 3 is used in various commonly-used projectors, specific description thereof will be omitted. As shown in FIG. 2, the optical unit 3 includes a light source device 3A having a light source lamp, a light modulating device (not shown) such as a liquid crystal panel that modulates a luminous flux emitted from the light source device 3A, the projection lens 3C projecting the luminous flux modulated by the light modulating device, and the like.

As shown in FIG. 2, the power supply unit 4 is disposed inside the virtually L shape in a plan view of the optical unit 3 (between the front wall section 2A and the light source device 3A), and supplies power to the components of the projector 1.

Figure 3:
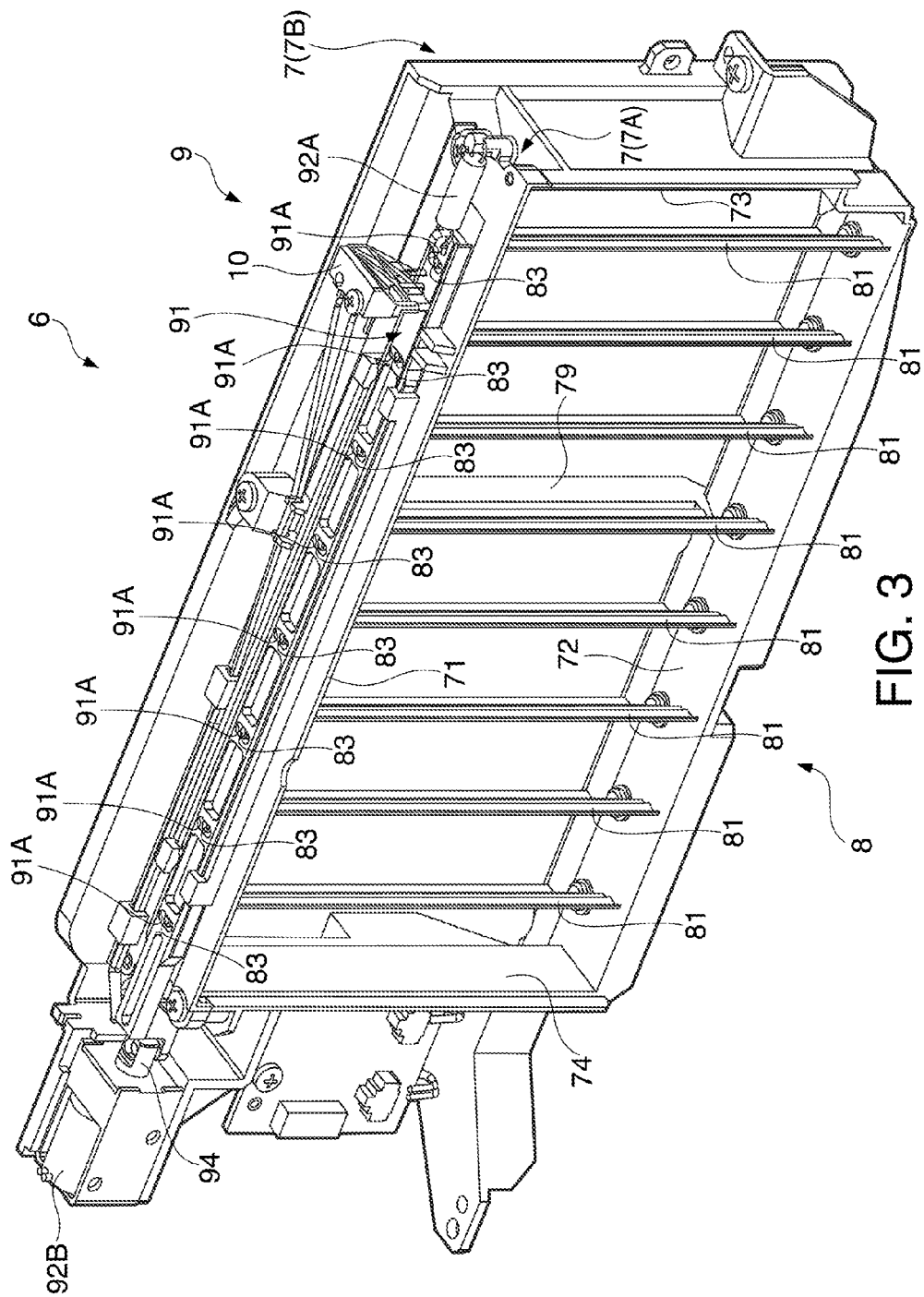
FIG. 3 is a perspective view showing the structure of a shutter apparatus in the first embodiment.
Figure 4:
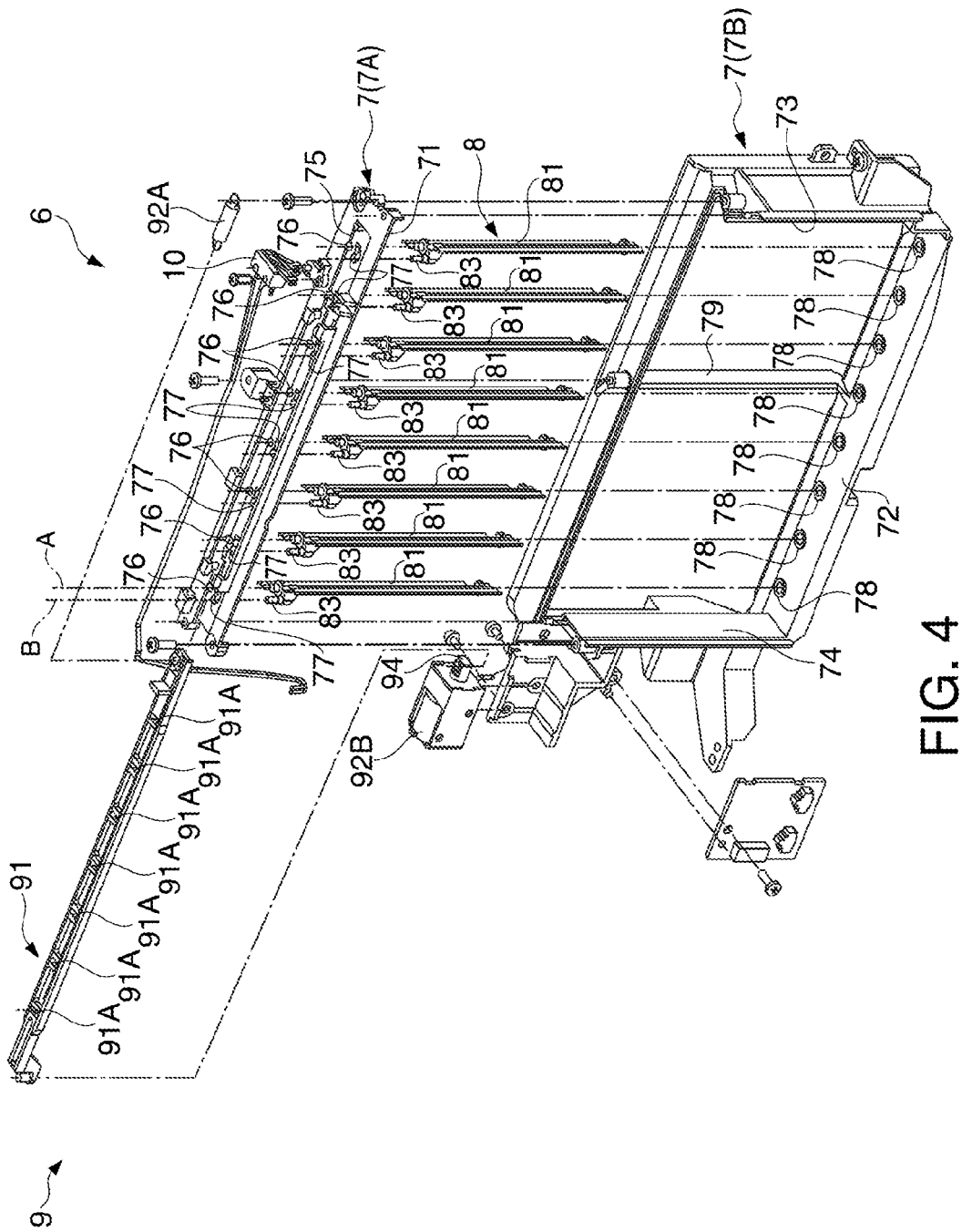
FIG. 4 is an exploded perspective view showing the structure of the shutter apparatus in the first embodiment.

As shown in FIG. 2, the exhaust fan 5 is disposed near the light source device 3A. The exhaust fan 5 sucks air near the light source device 3A and exhausts the air to the outside of the outer housing 2 via the exhaust port 21.
Structure of the Shutter Apparatus FIGS. 3 and 4 are diagrams showing the structure of the shutter apparatus 6. Specifically, FIG. 3 is a perspective view of the shutter apparatus 6 as seen from the front face's left side, and FIG. 4 is an exploded perspective view thereof.

The shutter apparatus 6 opens and closes the exhaust port 21.

As shown in FIGS. 3 and 4, the shutter apparatus 6 includes a frame member 7, a louver 8, and a drive mechanism 9.

Structure of the Frame Member

The frame member 7 integrally combines the components 8, 9, etc. forming the shutter apparatus 6, and is attached to the inside of the outer housing 2 so as to face the exhaust port 21.

As shown in FIG. 3, the frame member 7 has an upper edge section 71 and a lower edge section 72 which are located on the upper side and the lower side, respectively, and a front edge section 73 and a back edge section 74 which are located on the front face side and the back face side, respectively, and is formed in the shape of a rectangular frame surrounding the exhaust port 21 as seen from the left wall section 2C.

In addition, as shown in FIG. 4, in the frame member 7, part of the upper edge section 71 (hereinafter a first frame member 7A) is formed so that it can be attached to and detached from the other part (hereinafter a second frame member 7B).

As shown in FIG. 4, the first frame member 7A is formed into a rectangular plate extending in the front-back direction (a direction from the front face side to the back face side).

In the first frame member 7A, a guide groove 75 which becomes depressed and extends in a longitudinal direction of the first frame member 7A is formed.

In the bottom portion of the guide groove 75, first circular holes 76 are formed at regular intervals in the longitudinal direction of the first frame member 7A.

Moreover, in the position near each first circular hole 76, a regulating hole 77 extending in an arc with each first circular hole 76 at the center thereof is formed.

In the second frame member 7B, as shown in FIG. 4, in the lower edge section 72, second circular holes 78 are formed in positions facing the first circular holes 76.

Moreover, roughly in the center in the front-back direction in the second frame member 7B, a partition section 79 which extends over the upper edge section 71 and the lower edge section 72 and functions as a partition between the side of the space where the light source device 3A is disposed and the side of the space where the power supply unit 4 is disposed is formed.

Structure of the Louver

The louver 8 is rotatably supported pivotally between the upper edge section 71 and the lower edge section 72, and rotates to an open position (see FIG. 6A) in which the louver 8 opens an opening (the exhaust port 21) of the frame member 7 or to a close position (see FIG. 6B) in which the louver 8 closes the opening.

As shown in FIGS. 3 and 4, the louver 8 includes a plurality of louver boards 81.

Figure 5:
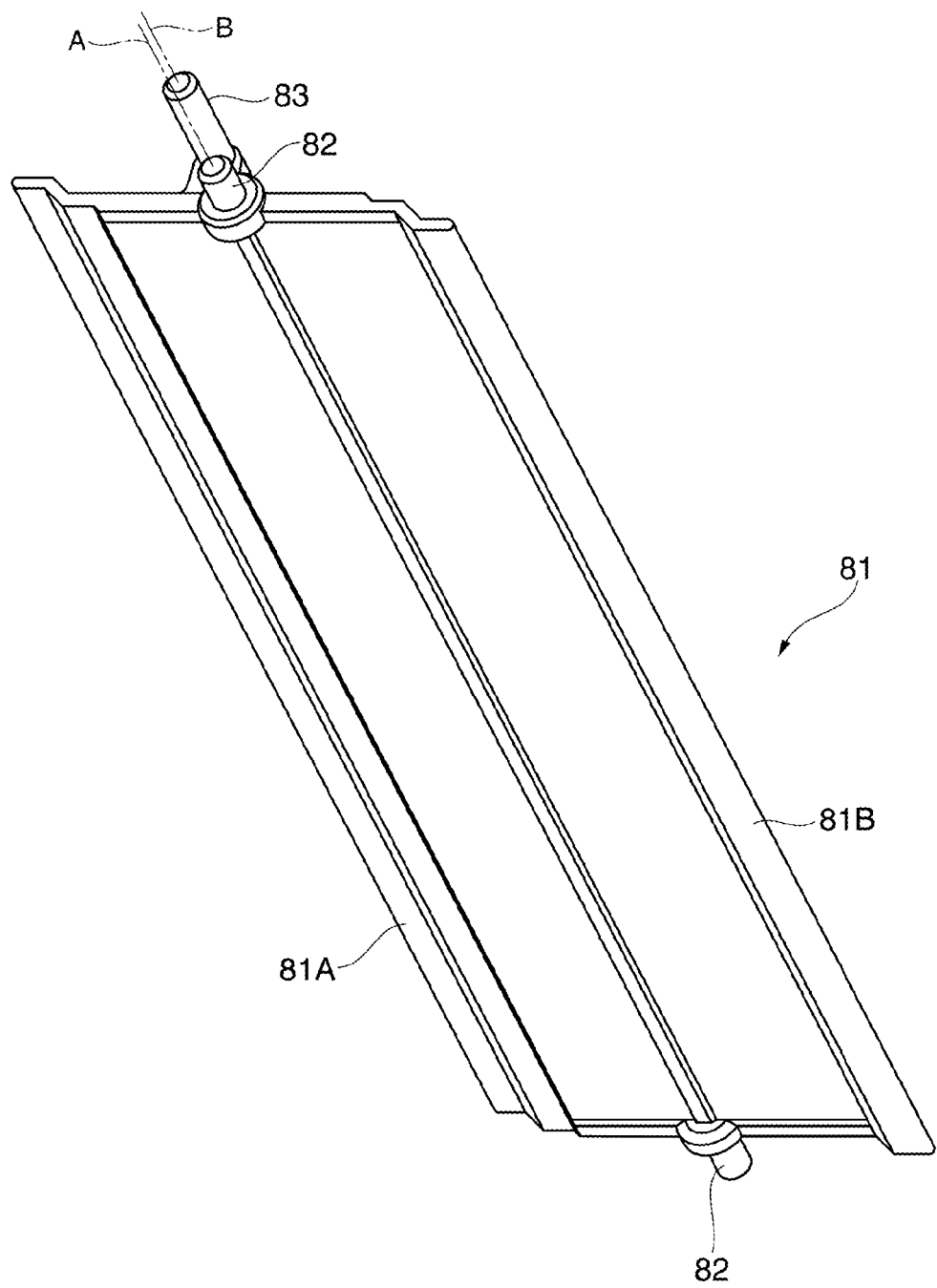
FIG. 5 is a perspective view showing the structure of a louver board in the first embodiment.

FIG. 5 is a perspective view showing the structure of the louver board 81.

As shown in FIG. 5, the louver board 81 includes a pair of extending sections 81A and 81B extending from a rotation axis A, which is the center of rotation of the louver board 81, in opposite directions and each having an end which is bent like a crank. In addition, the extending sections 81A and 81B have a shape which is rotationally symmetric about the rotation axis A.

In the louver board 81, as shown in FIG. 5, shaft sections 82 protruding along the rotation axis A are formed at the upper and lower ends.

In the louver board 81, the shaft sections 82 are pivotally supported in the circular holes 76 and 78 of the upper edge section 71 and the lower edge section 72.

Moreover, in the louver board 81, as shown in FIG. 5, a cam pin 83 as a projecting section which is placed in a position displaced from an area of the extending section 81A, the area close to the shaft section 82, in an out-of-plane direction and projects in parallel to the shaft section 82 is formed at the upper end. The cam pin 83 is formed into a cylindrical shape. Incidentally, an axis B is a central axis of the cam pin 83.

In addition, in a state in which the louver board 81 is pivotally supported between the upper edge section 71 and the lower edge section 72, the cam pin 83 is inserted in the regulating hole 77 and projects to a position above the upper edge section 71.

Structure of the Drive Mechanism

The drive mechanism 9 operates the louver 8, and, as shown in FIG. 3 or 4, includes a cam plate 91 as a moving member, an elastic member 92A, and a solenoid 92B.

Structure of the Cam Plate

The cam plate 91 engages the cam pins 83 of the plurality of louver boards 81, and, as a result of exerting a force on the cam pins 83, rotates the louver boards 81 (the louver 8) at once to the open position or the close position.

As shown in FIG. 4, the cam plate 91 is formed into a rectangular plate extending in the front-back direction. In addition, the cam plate 91 is formed in such a way that it freely fits into the guide groove 75 of the first frame member 7A and can move rectilinearly in the front-back direction.

As shown in FIG. 3 or 4, in the cam plate 91, long holes 91A are formed at regular intervals (intervals at which the louver boards 81 are disposed) in a longitudinal direction of the cam plate 91.

The long holes 91A are formed so as to extend in a horizontal direction perpendicular to a direction in which the cam plate 91 moves.

In addition, in a state in which the cam plate 91 freely fits into the guide groove 75, the cam pins 83 projecting to a position above the upper edge section 71 are inserted in the long holes 91A.

Figure 6A:
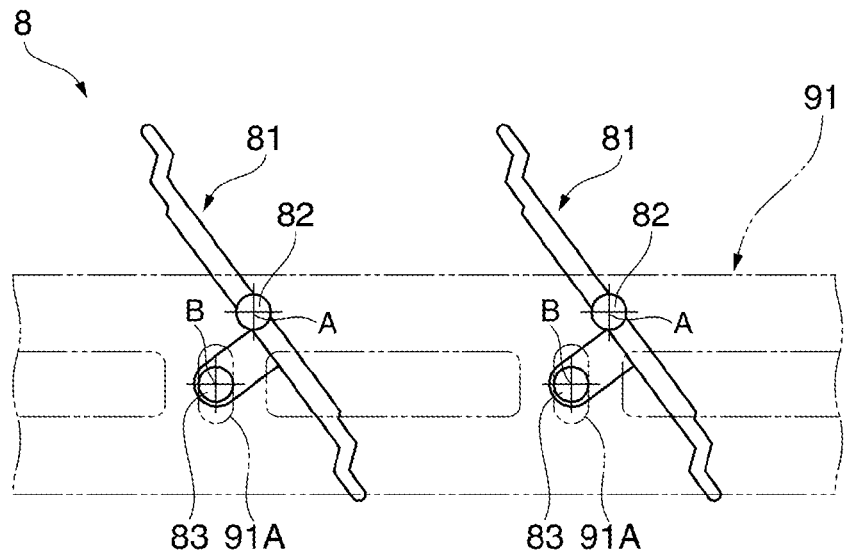
FIGS. 6A and 6B are plan views showing the operations of the louver board and a cam plate in the first embodiment.
Figure 6B:
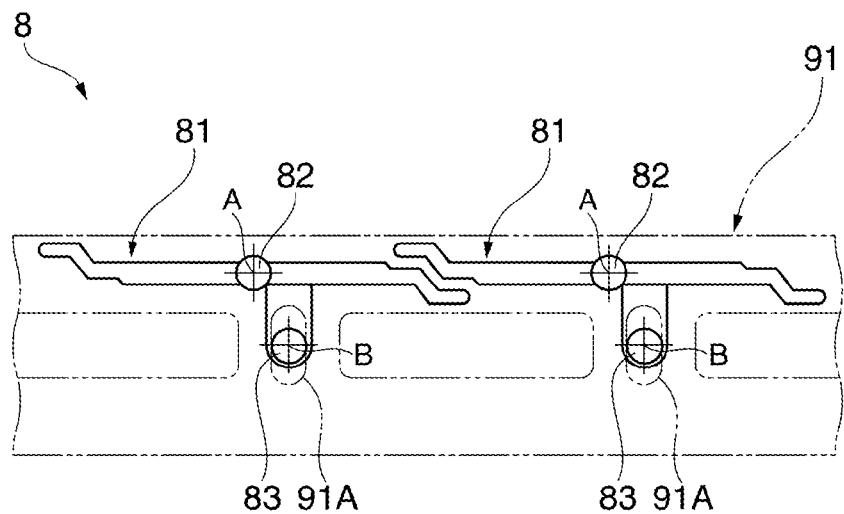

FIGS. 6A and 6B are plan views for explaining the operations of the louver board 81 and the cam plate 91. Specifically, FIGS. 6A and 6B are partial plan views in which the louver board 81 and the cam plate 91 are seen from above. Incidentally, FIG. 6A shows a state in which the louver 8 is in the open position, and FIG. 6B shows a state in which the louver 8 is in the close position. Moreover, in FIGS. 6A and 6B, the right side corresponds to the front face side of the projector 1, and the left side corresponds to the back face side of the projector 1.

The louver 8 rotates from the open position to the close position as follows.

That is, as shown in FIG. 6A, the cam plate 91 is located on the back face side in the open position. Here, when the cam plate 91 is moved to the front face side, the cam pins 83 are pressed against the front face side by the inner edge of the long holes 91A, and the louver boards 81 rotate all at once (in FIGS. 6A and 6B, rotate in a counterclockwise direction) simultaneously with the movement of the cam plate 91, whereby the louver 8 moves to the close position (FIG. 6B).

Moreover, by operating the cam plate 91 in an opposite manner, the louver 8 rotates from the close position to the open position.

Figure 7:
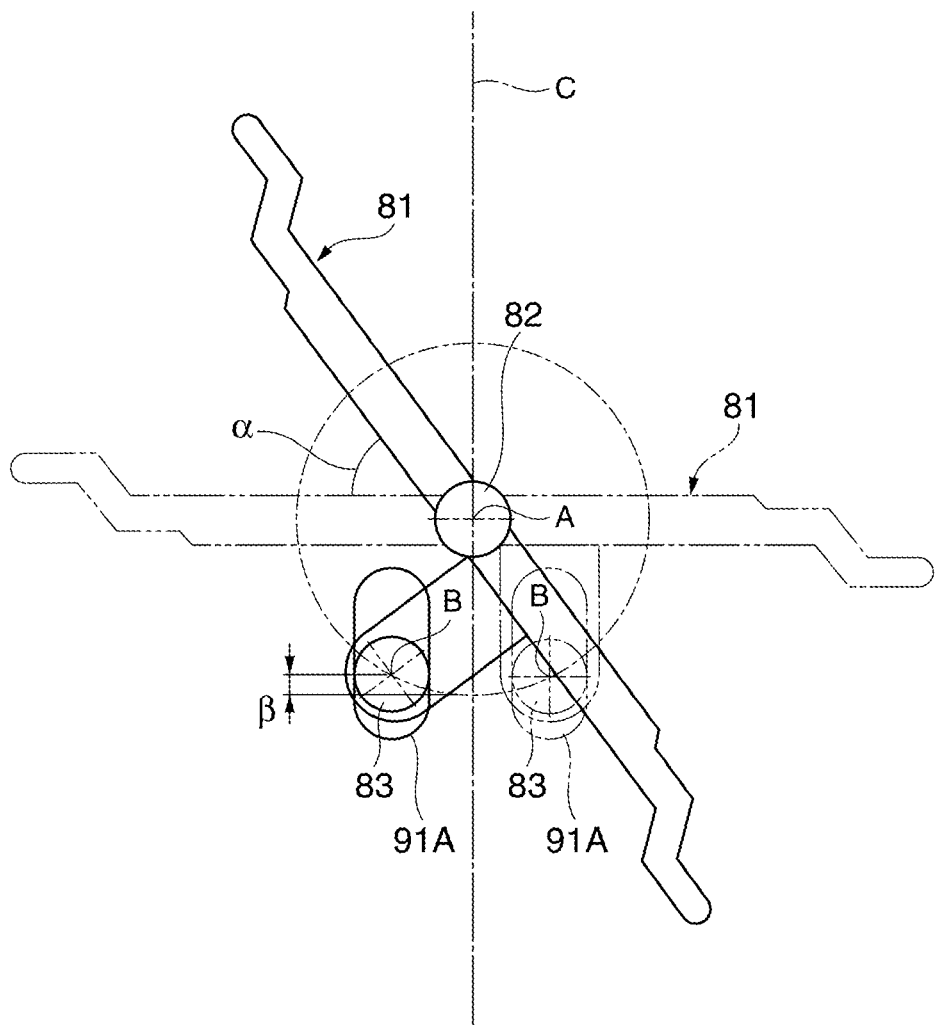
FIG. 7 is a plan view showing the position of the louver board and the position of the cam pin in the first embodiment.

FIG. 7 is a diagram showing the position of the louver board 81 and the position of the cam pin 83. Specifically, in FIG. 7, a state in which the louver board 81 (the louver 8) is in the open position is indicated by solid lines. Moreover, in FIG. 7, a state in which the louver board 81 is in the close position is indicated by chain double-dashed lines. In FIG. 7, the cam plate 91 moves in the horizontal direction.

Here, an angle α shown in FIG. 7 indicates the angle of the open position of the louver board 81 with respect to the close position thereof. Specifically, it is preferable that the angle α be less than 90 degrees and more than 45 degrees but less than 60 degrees. When the angle α is less than 45 degrees, it becomes impossible to exhaust air adequately; when the angle α is more than 60 degrees, the amount of leak light from the projector 1 is increased. In this embodiment, the angle α is set at 55 degrees so that, when the louver 8 is in the open position, the exhaust air flows diagonally to the front of the projector 1.

Moreover, as shown in FIG. 7, the cam pin 83 is set so that the positions of the cam pin 83 in the open position and in the close position are located on opposite sides of a virtual plane C which includes the rotation axis A and is perpendicular to the direction in which the cam plate 91 moves. By doing so, the cam pin 83 describes, in a moving range of the louver board 81, a gentle arc trajectory which is nearly parallel to the direction in which the cam plate 91 moves. As a result, as compared to a case in which the positions of the cam pin 83 in the open position and in the close position are not located on opposite sides of the virtual plane C, the cam pin 83 moves in the direction in which the cam plate 91 moves. In this embodiment, the positions of the cam pin 83 are set so as to be symmetric with respect to the virtual plane C such that the direction in which the cam pin 83 moves coincides with the direction in which the cam plate 91 moves to the maximum extent possible.

Structure of the Elastic Member

The elastic member 92A is a member which biases the cam plate 91 forward.

In this embodiment, the elastic member 92A is formed of an extension spring, and, as shown in FIG. 4, is attached between a front face's-side end of the cam plate 91 and the frame member 7.

Structure of the Solenoid

Figure 8A:
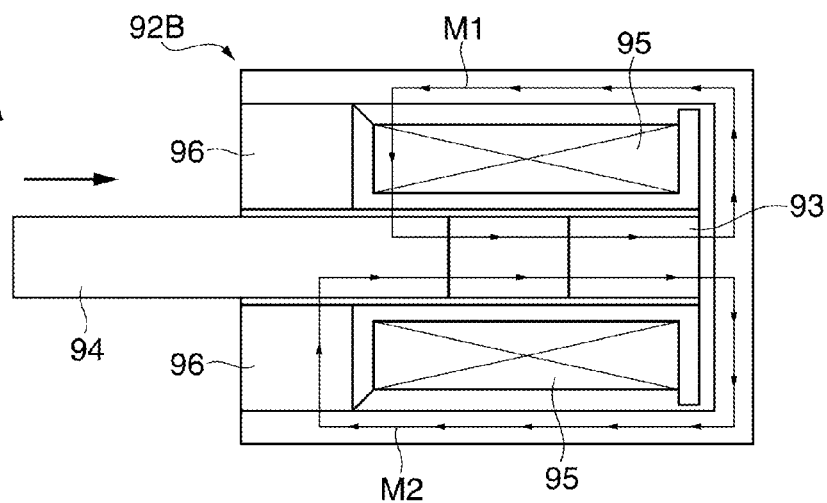
FIGS. 8A to 8C are diagrams explaining the structure and operation of a solenoid in the first embodiment.
Figure 8B:
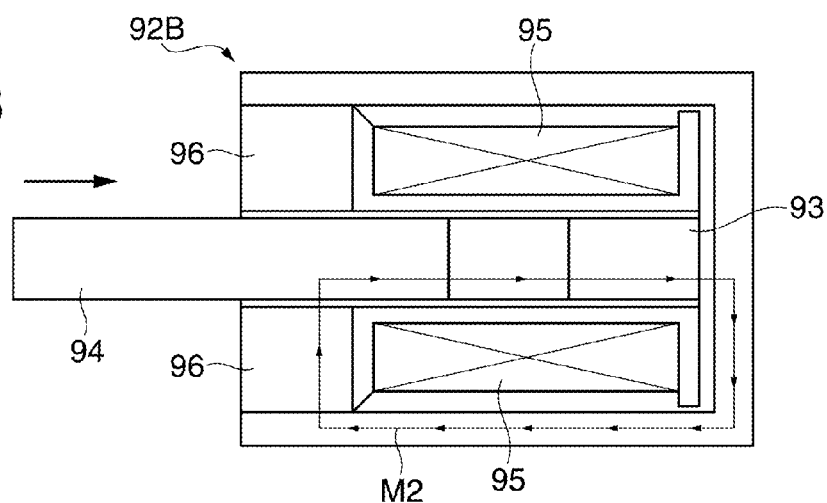
Figure 8C:
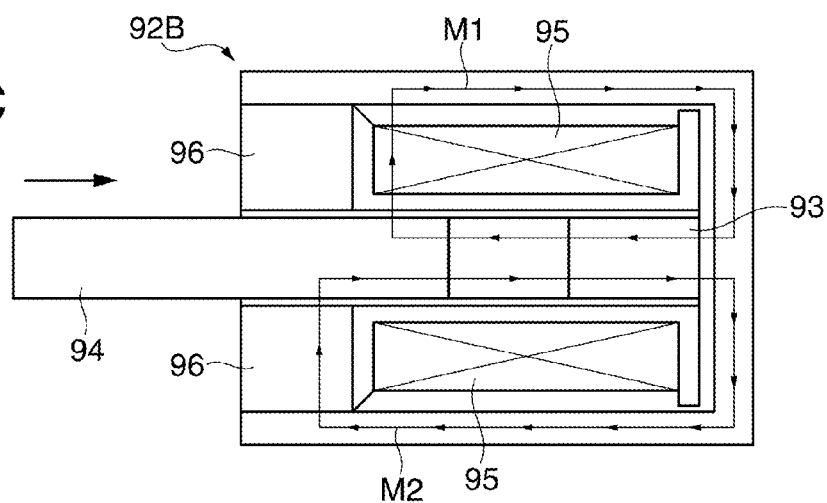

FIGS. 8A to 8C are diagrams for explaining the structure and operation of the solenoid 92B.

The solenoid 92B operates the cam plate 91.

As shown in FIGS. 8A to 8C, the solenoid 92B is formed as a self-holding solenoid including, in addition to a fixed iron core 93 as a fixed member fixed in the solenoid 92B, a movable iron core 94 as a movable member which gets closer to and moves away from the fixed iron core 93, and an exciting coil 95 exciting the movable iron core 94 by the passage of electric current therethrough, a permanent magnet 96.

In the solenoid 92B described above, the movable iron core 94 is connected to a back face's-side end of the cam plate 91. Moreover, the solenoid 92B is fixed to the frame member 7 in such a way that the direction in which the movable iron core 94 moves away from the fixed iron core 93 corresponds to the direction to the front face side and the direction in which the movable iron core 94 gets closer to the fixed iron core 93 corresponds to the direction to the back face side (in such away that the direction in which the movable iron core 94 moves becomes the front-back direction).

Then, the solenoid 92B performs sucking operation, sucking and sticking operation, and restoring operation which will be described below. Incidentally, in FIGS. 8A to 8C, for the sake of description, arrows M1 located above the fixed iron core 93 represent the direction of a magnetic flux generated by the exciting coil 95, and arrows M2 located below the fixed iron core 93 represent the direction of a magnetic flux generated by the permanent magnet 96.

First, the solenoid 92B performs sucking operation by passing a suction current through the exciting coil 95. That is, as a result of the suction current passing through the exciting coil 95, as shown in FIG. 8A, the magnetic flux generated by the exciting coil 95 and the magnetic flux generated by the permanent magnet 96 are combined. Then, the suction power between the movable iron core 94 and the fixed iron core 93 increases, and the suction power makes the movable iron core 94 move in a direction (to the back face side) in which the movable iron core 94 gets closer to the fixed iron core 93 while resisting the tensile stress of the elastic member 92A.

That is, with the sucking operation of the solenoid 92B, the cam plate 91 moves to the back face side, and the louver 8 rotates to the open position.

Next, the solenoid 92B performs sucking and sticking operation by passing no current through the exciting coil 95. That is, by passing no current through the exciting coil 95, as shown in FIG. 8B, a state in which the movable iron core 94 is made to stick to the fixed iron core 93 is kept by the suction power between the movable iron core 94 and the fixed iron core 93, the suction power generated by the magnetomotive force of the permanent magnet 96.

That is, by the sucking and sticking operation of the solenoid 92B, the louver 8 is kept in a state in which the louver 8 is located in the open position.

Next, the solenoid 92B performs restoring operation by passing a restoring current through the exciting coil 95, the restoring current flowing in a direction opposite to the direction of the current in the sucking operation. That is, as a result of the restoring current passing through the exciting coil 95, as shown in FIG. 8C, the magnetic flux generated by the exciting coil 95 and the magnetic flux generated by the permanent magnet 96 cancel out each other. Then, the suction power between the movable iron core 94 and the fixed iron core 93 decreases and eventually becomes smaller than the tensile stress of the elastic member 92A. As a result, the movable iron core 94 moves in a direction (to the front face side) in which the movable iron core 94 moves away from the fixed iron core by the tensile stress of the elastic member 92A.

That is, with the restoring operation of the solenoid 92B, the cam plate 91 moves to the front face side and the louver 8 rotates to the close position.

As described above, since the self-holding solenoid is configured so as to pass current only at the moment of the sucking operation and the restoring operation, the self-holding solenoid can achieve greater power savings than a motor or the like.

Configuration of the Control Unit

Figure 9:
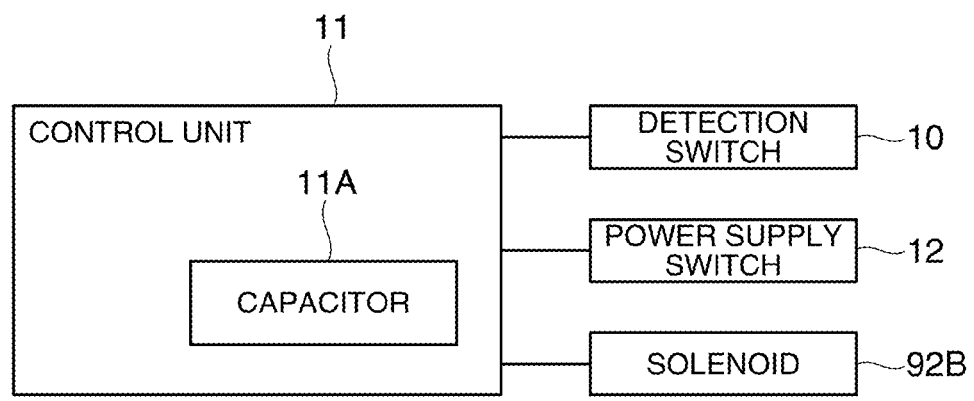
FIG. 9 is a block diagram for explaining a control structure of a control unit in the first embodiment.

FIG. 9 is a block diagram for explaining a control structure of the control unit 11.

The control unit 11 controls the entire operation of the projector 1.

Incidentally, hereinafter, of the control structure of the control unit 11, a control structure related to the operation of the solenoid 92B will be mainly described, and description of the other control structure will be omitted or simplified.

As shown in FIG. 9, the control unit 11 controls the operation of the solenoid 92B according to an operating signal from a power supply switch 12 provided in the outer housing 2 or the like.

For example, when the power supply switch 12 is operated by the user and an operating signal to turn on a power supply is input to the control unit 11, the control unit 11 makes the solenoid 92B perform the sucking operation by passing a suction current through the exciting coil 95. As a result, the louver 8 rotates to the open position.

Then, after the control unit 11 confirms that the louver 8 is located in the open position by a mechanical switch (a detection switch 10 (FIGS. 3, 4, and 9)) that detects the position (an opened/closed state of the louver 8) of the cam plate 91, the control unit 11 starts driving of the light source device 3A and the exhaust fan 5.

Moreover, for example, when the power supply switch 12 is operated by the user and an operating signal to turn off the power supply is input to the control unit 11, after the control unit 11 turns off the light source device 3A and stops the driving of the exhaust fan 5, the control unit 11 makes the solenoid 92B perform the restoring operation by passing a restoring current through the exciting coil 95. As a result, the louver 8 rotates to the close position.

Incidentally, as shown in FIG. 9, the control unit 11 includes a capacitor 11A as a standby power supply which is used when the power supply from the outside is suddenly interrupted as a result of a power plug (not shown) being pulled while the projector 1 is used.

In addition, when the power supply from the outside is interrupted, the control unit 11 makes the solenoid 92B perform the restoring operation by passing a restoring current through the exciting coil 95 by using the capacitor 11A. That is, when the power plug is pulled while the projector 1 is used, the louver 8 rotates to the close position by the above-described processing.

The first embodiment described above has the following effects.

In this embodiment, the positions of the cam pin 83 in the open position and in the close position in the louver board 81 are set so as to be located on opposite sides of the virtual plane C which includes the rotation axis A and is perpendicular to the direction in which the cam plate 91 moves. As a result, when the louver 8 (the louver board 81) rotates from the open position to the close position or when the louver 8 (the louver board 81) rotates from the close position to the open position, the cam pin 83 moves in the direction in which the cam plate 91 moves as compared to a case in which the positions of the cam pin 83 in the open position and in the close position are not located on opposite sides of the virtual plane C.

This makes it possible to transmit the force that moves the cam plate 91 efficiently to the cam pin 83 (the louver board 81), eliminates the need for a great force to move the cam plate 91 (to rotate the louver board 81), and makes it possible to open and close the exhaust port 21 smoothly while controlling a driving force.

In particular, since the positions of the cam pin 83 are set so as to be symmetric with respect to the virtual plane C, it is possible to make the cam pin 83 move more efficiently in the direction in which the cam plate 91 moves.

Moreover, by operating the cam plate 91 with the solenoid 92B, it is possible to move the cam plate 91 rectilinearly by directly using the rectilinear motion of the solenoid 92B, and there is no need to use an intermediate member such as a gear between the solenoid 92B and the cam plate 91.

Therefore, as compared to a case in which the cam plate 91 is operated by a motor or the like, the structure of the drive mechanism 9 can be simplified. Moreover, as compared to a case in which a motor or the like is used as a component element, it is possible to reduce power consumption.

Furthermore, by forming the solenoid 92B as a self-holding solenoid, it is possible to keep a suction state even when current is not always passed through the exciting coil 95 and keep the position of the louver board 81.

Therefore, as compared to a case in which the solenoid 92B is formed as another solenoid that is not a self-holding solenoid, it is possible to reduce power consumption even further.

Moreover, even when power supply from the outside is interrupted, it is possible to switch the position of the louver board 81 to the close position by driving the solenoid 92B with the capacitor 11A.

At this time, since the louver board 81 is rotated to the close position according to the restoring operation, it is possible to reduce power consumption and drive the solenoid 92B by a lower-capacity and low-cost capacitor.

Furthermore, since the louver board 81 has a shape which is rotationally symmetric about the rotation axis A and is formed of the pair of extending sections 81A and 81B extending from the rotation axis A in opposite directions, the center of gravity of the louver board 81 is located on the rotation axis A. As a result, even when the position of the projector 1 is changed according to the angle of projection or the like, there is no possibility that the rotational position of the louver board 81 is moved from an intended position.

Moreover, since the angle $\alpha$ is 55 degrees and is small compared to a case in which the angle $\alpha$ is set at 90 degrees, for example, it is possible to make the amount of change $\beta$ (FIG. 7) in the horizontal direction smaller, the horizontal direction perpendicular to the direction in which the cam plate 91 moves, in a moving range of the louver board 81. This makes it possible to shorten the length of the long hole 91A necessary to rotate the louver board 81 and narrow the cam plate 91. That is, since the weight of the cam plate 91 can be reduced, it is possible to operate the cam plate 91 with a small force.

Second Embodiment

Next, a second embodiment of the invention will be described based on the drawings.

In this embodiment, unlike the first embodiment described above, in the louver board 81 and the frame member 7 as a supporting member, an engagement structure that engages them is provided.

Moreover, in this embodiment, the projector 1 supports installation in a stationary position (a position in which the projector 1 is installed on an installation surface such as a desk (a position in FIG. 1)) and installation in a ceiling-hung position (a position in which the projector 1 is installed on a ceiling or the like in such a way that the projector 1 in a stationary position is turned upside down).

Engagement Structure of the Louver Board and the Frame Member

Figure 10:
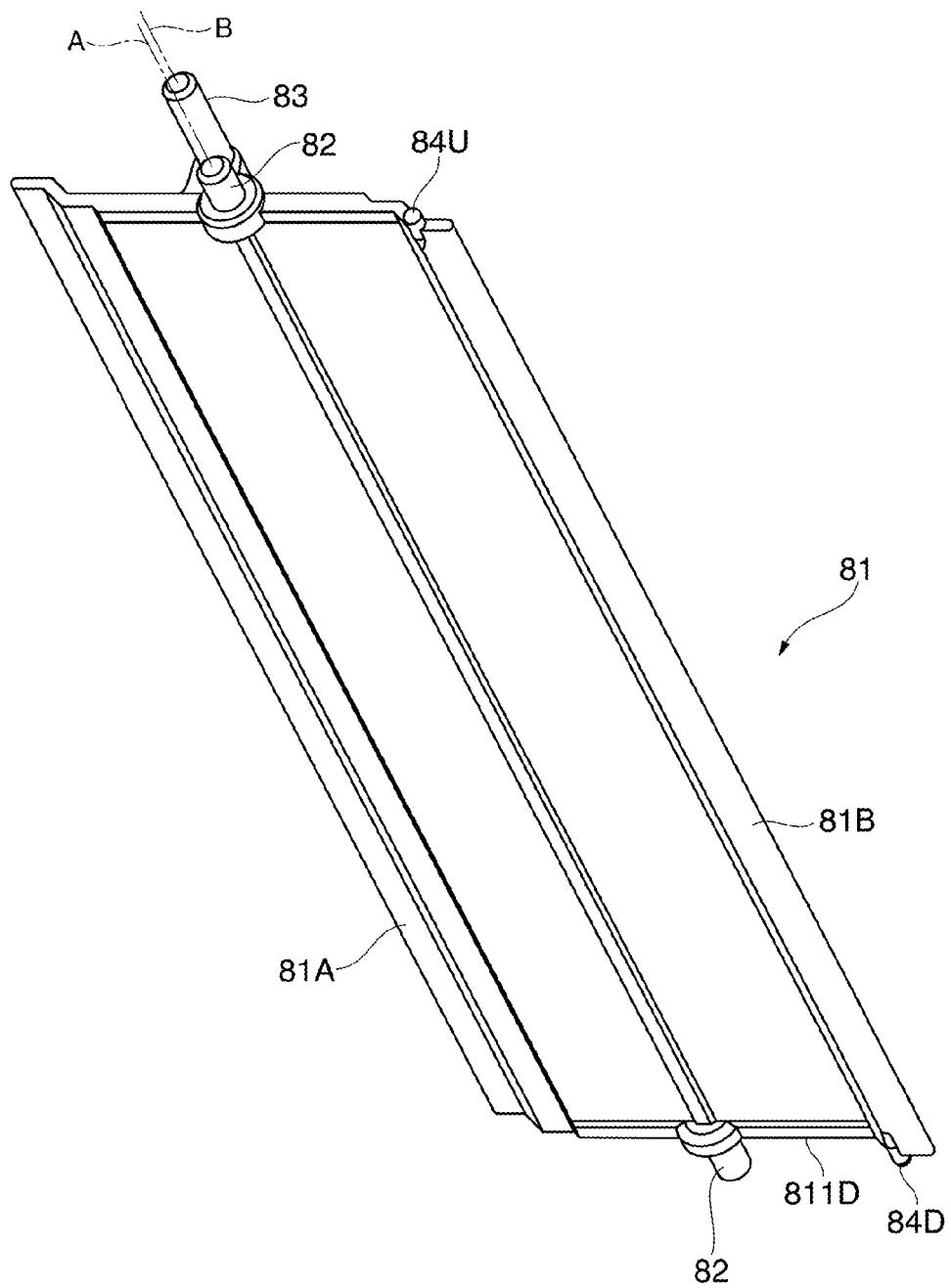
FIG. 10 is a perspective view showing the structure of the louver board in a second embodiment.

FIG. 10 is a perspective view showing the structure of the louver board 81.

Figure 11:
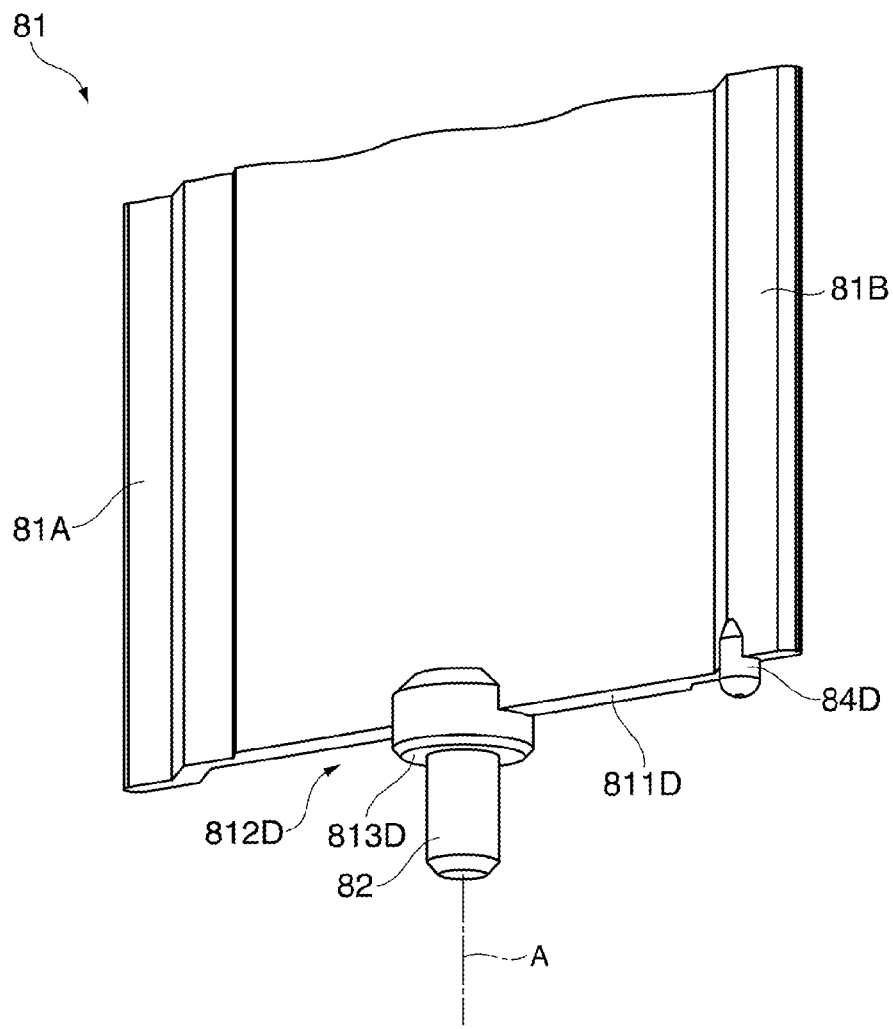
FIG. 11 is a perspective view showing part of the louver board, the part which is enlarged, in the second embodiment.

FIG. 11 is a perspective view showing part of the louver board 81, the part which is enlarged. Specifically, FIG. 11 is a perspective view in which the lower end of the louver board 81 is seen from diagonally below.

Incidentally, hereinafter, the structure of the lower end of the louver board 81 is described as an example; however, as shown in FIG. 10, the upper end also has the same structure.

As shown in FIG. 11, the louver board 81 has an end section 811D at the lower edge located at the end of the extending section 81B in the vertical direction thereof. In addition, the shaft section 82 projects from the end section 811D via a seat section 812D.

The seat section 812D has a cylindrical shape having a diameter which is greater than that of the shaft section 82 on the same axis as the rotation axis A, projects from the lower portion of the louver board 81, and has an annular bearing surface 813D facing the lower edge section 72.

In the end section 811D, an engaging section 84D projecting in a direction from the end section 811D to the lower edge section 72 is provided. The engaging section 84D is provided in the end section 811D in an edge side of the extending section 81B. As shown in FIG. 11, the engaging section 84D has a hemispherical end.

Figure 12:
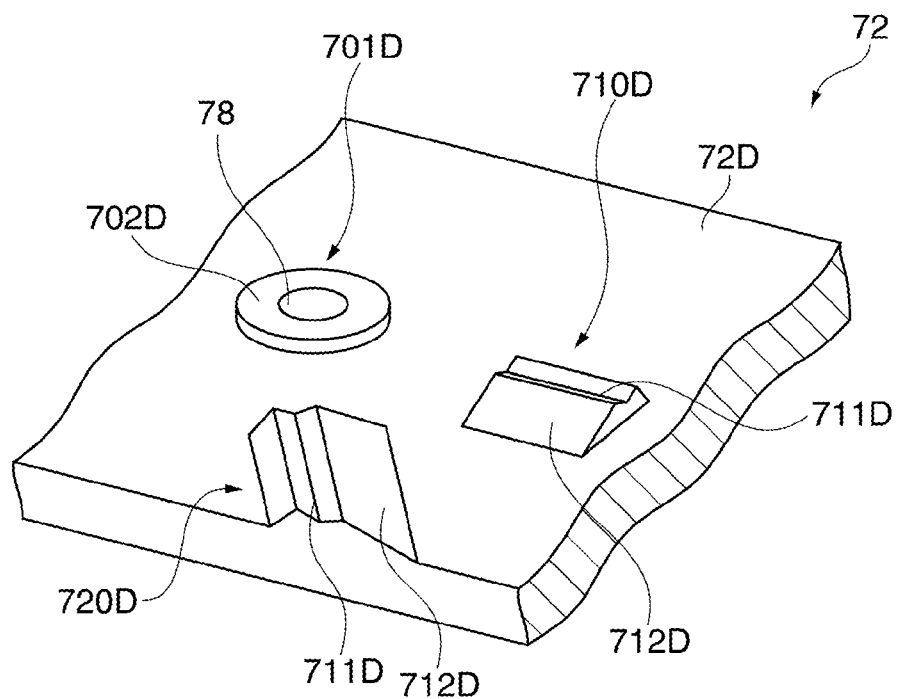
FIG. 12 is a perspective view showing part of a lower edge section, the part which is enlarged, in the second embodiment.

FIG. 12 is a perspective view showing part of the lower edge section 72, the part which is enlarged. Specifically, as is the case with FIG. 10, FIG. 12 is a perspective view in which the shutter apparatus 6 is seen from the front face's left side. Incidentally, hereinafter, the structure of the lower edge section 72 will be described as an example; however, the upper edge section 71 also has the same structure.

The lower edge section 72 has a flat section 72D facing the upper edge section 71. In the flat section 72D, a seat section 701D, a first locking section 710D as a locking section, and a second locking section 720D are provided.

The seat section 701D projects from the flat section 72D to the upper edge section 71 so as to form a step along the outer edge of the second circular hole 78, and has an annular bearing surface 702D facing the upper edge section 71.

Together with the engaging section 84D, the first locking section 710D forms an engagement structure. The first locking section 710D has a concave section 711D and an inclined surface 712D, and is formed into a projecting shape projecting from the flat section 72D to the upper edge section 71. The first locking section 710D prevents the sway of the louver board 81 by locking the louver board 81 in the close position (the locked position) in which the engaging section 84D is engaged in the concave section 711D of the first locking section 710, and is provided in a position in which the first locking section 710D faces the engaging section 84D in the close position.

The concave section 711D is a V-shaped groove in which the engaging section 84D is engaged, and is formed at the tip of the first locking section 710D. The concave section 711D is provided so as to intersect the trajectory of the engaging section 84D, the trajectory described when the louver board 81 is rotating. When the louver board 81 is in the close position, the engaging section 84D engages in the concave section 711D.

The inclined surface 712D is provided in a portion with which the engaging section 84D makes contact when the louver board 81 is rotating, and is formed as a surface which is inclined from the concave section 711D toward the flat section 72D along the trajectory of the engaging section 84D. The angle of inclination of the inclined surface 712D with respect to the flat section 72D can be appropriately set according to the driving force operating the cam plate 91. Specifically, even when the driving force is small, the louver board 81 can be rotated by setting the angle of inclination at a more obtuse angle.

The second locking section 720D has a shape similar to that of the first locking section 710D, and, together with the engaging section 84D, forms an engagement structure. The second locking section 720D prevents the sway of the louver board 81 by locking the louver board 81 in the open position (the locked position) in which the engaging section 84D is engaged in the concave section 711D of the second locking section 720D, and is provided in a position in which the second locking section 720D faces the engaging section 84D in the open position.

Figure 13:
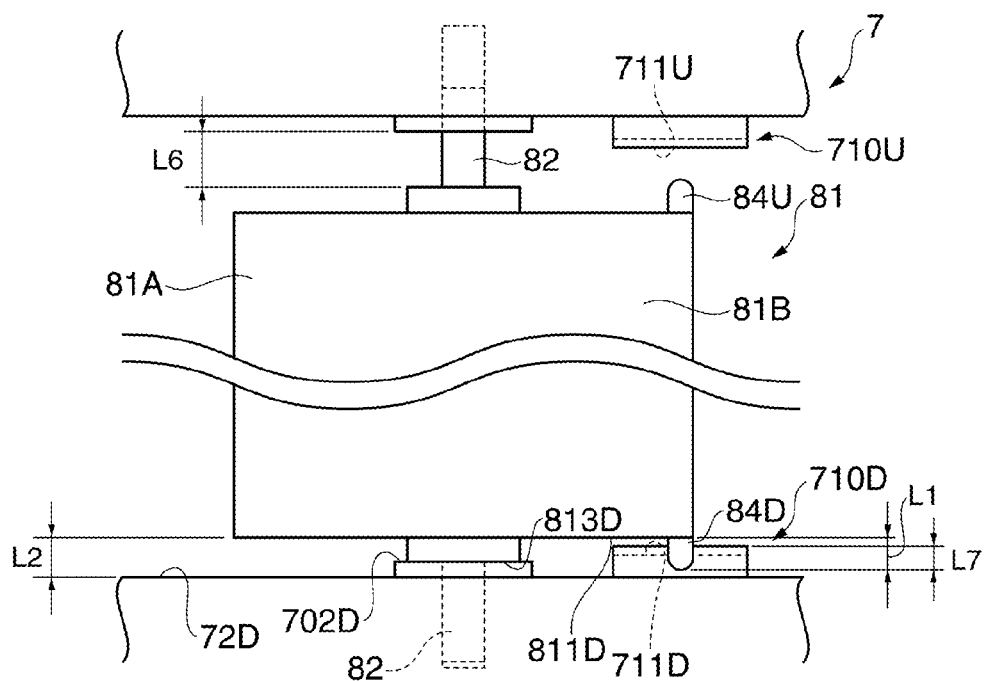
FIG. 13 is a schematic diagram explaining the length of an engagement structure in the second embodiment.
Figure 14:
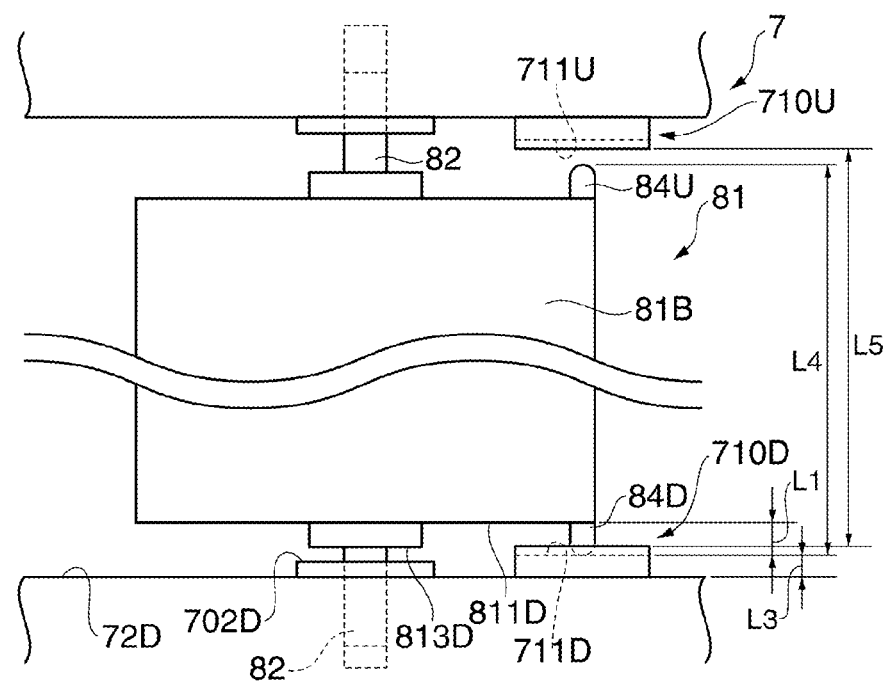
FIG. 14 is a schematic diagram explaining the length of the engagement structure in the second embodiment.

FIGS. 13 and 14 are schematic diagrams for explaining the length of the engagement structure. Specifically, FIG. 13 shows the length when the louver board 81 is in an intermediate position between the open position and the close position (hereinafter abbreviated as an intermediate position), and FIG. 14 shows the length when the louver board 81 is in the close position. Incidentally, hereinafter, the length of the engagement structure on the lower end side in the close position will be described as an example with reference to FIG. 13; however, the engagement structures on the upper end side and the engagement structures on the upper and lower end sides in the open position are formed so as to have the same length as the engagement structure described below.

As shown in FIG. 13, the engaging section 84D projects from the end section 811D to the flat section 72D by a projection length L1.

Here, the louver board 81 is pivotally supported with play along the rotation axis A (see FIG. 10). Therefore, the louver board 81 can move along the rotation axis A, and, as shown in FIG. 13, moves downward under its own weight in the intermediate position, and the bearing surface 702D of the lower edge section 72 abuts the bearing surface 813D of the louver board 81. In this state, a gap L2 is formed between the end section 811D and the flat section 72D.

The gap L2 is formed so as to be larger than the projection length L1 of the engaging section 84D (L1<L2). That is, as shown in FIG. 13, when the louver board 81 is in the intermediate position, the engaging section 84D does not make contact with the flat section 72D.

Moreover, the gap L2 is formed so as to be smaller than the length which is the sum of the projection length L1 of the engaging section 84D and a length L3 from the point of the engaging section 84D to the flat section 72D in the locked position (the close position) shown in FIG. 14 (L1+L3>L2). That is, as shown in FIG. 14, the louver board 81 does not move all the way downward, and the bearing surface 702D of the lower edge section 72 and the bearing surface 813D of the louver board 81 are away from each other.

Furthermore, as shown in FIG. 14, a length L4 from the point of the engaging section 84D to the point of an engaging section 84U is formed so as to be shorter than a length L5 from the tip of the first locking section 710D to the tip of a first locking section 710U (L4<L5). Therefore, as shown in FIG. 14, in the close position, a gap is formed between the engaging section 84U on the upper end side and the first locking section 710U on the upper end side.

Moreover, as shown in FIG. 13, a distance L6 between the upper bearing surface 813D of the louver board 81 and the bearing surface 702D in the intermediate position between the open position and the close position, the distance which is a length of the play in the direction of the rotation axis A (a distance over which the louver board 81 can move in the direction of the rotation axis A), is greater than a distance L7 from the point of the engaging section 84D to the tip of the first locking section 710D in the intermediate position in a direction in which the engaging section 84D projects (L6>L7).

Operation of the Shutter Apparatus

Figure 15:
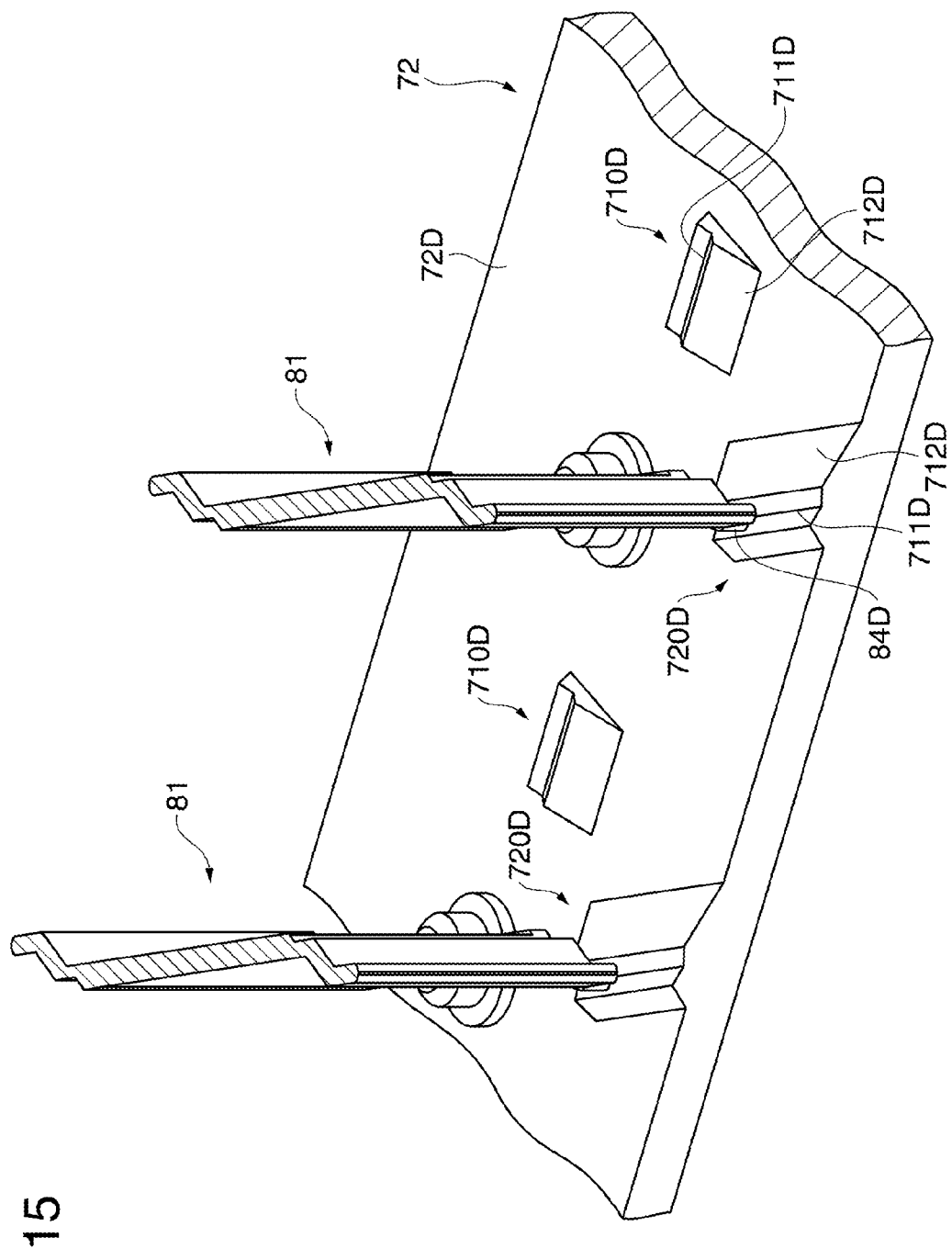
FIG. 15 is a diagram explaining the operation of a shutter apparatus in the second embodiment.
Figure 16:
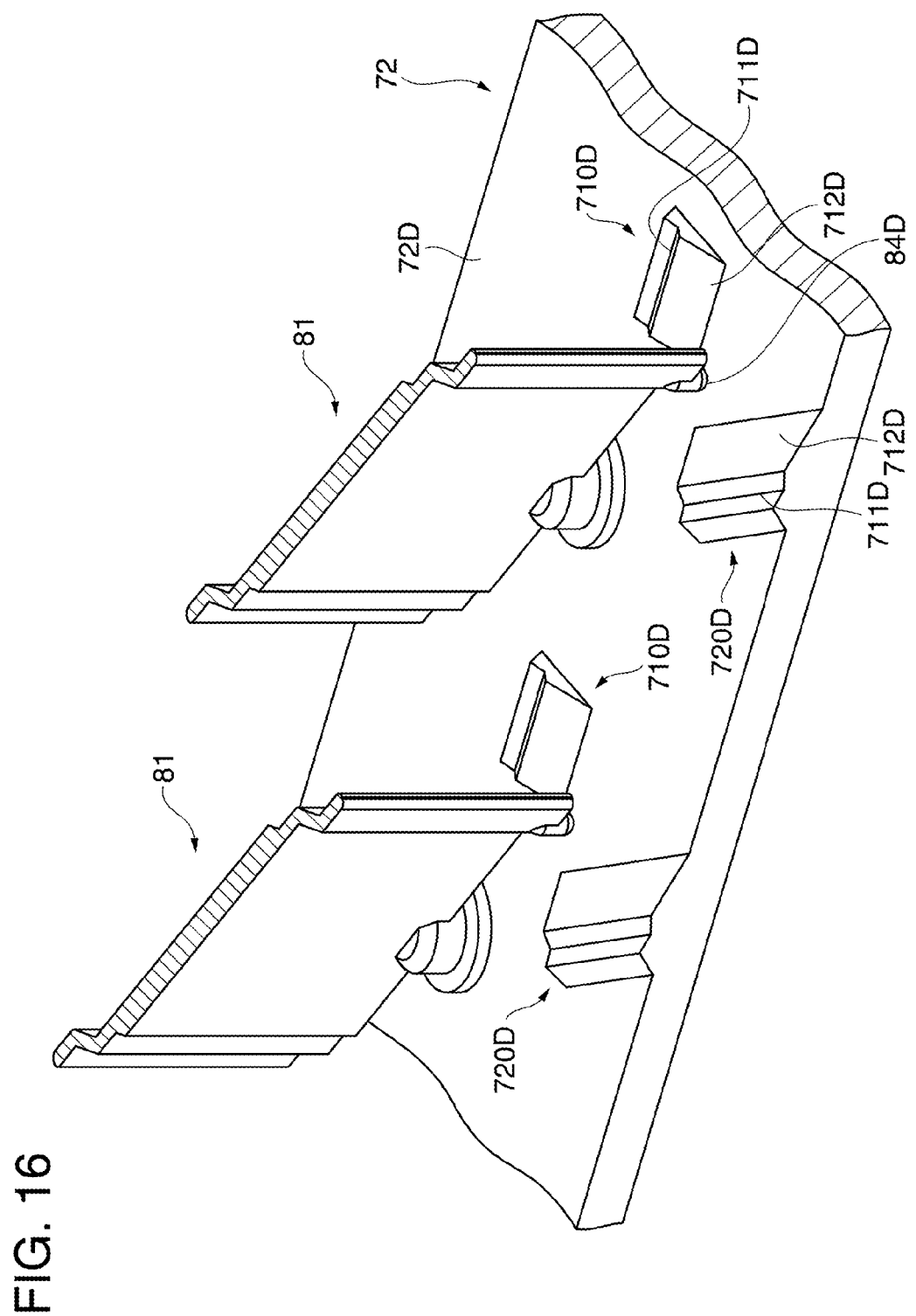
FIG. 16 is a diagram explaining the operation of the shutter apparatus in the second embodiment.
Figure 17:
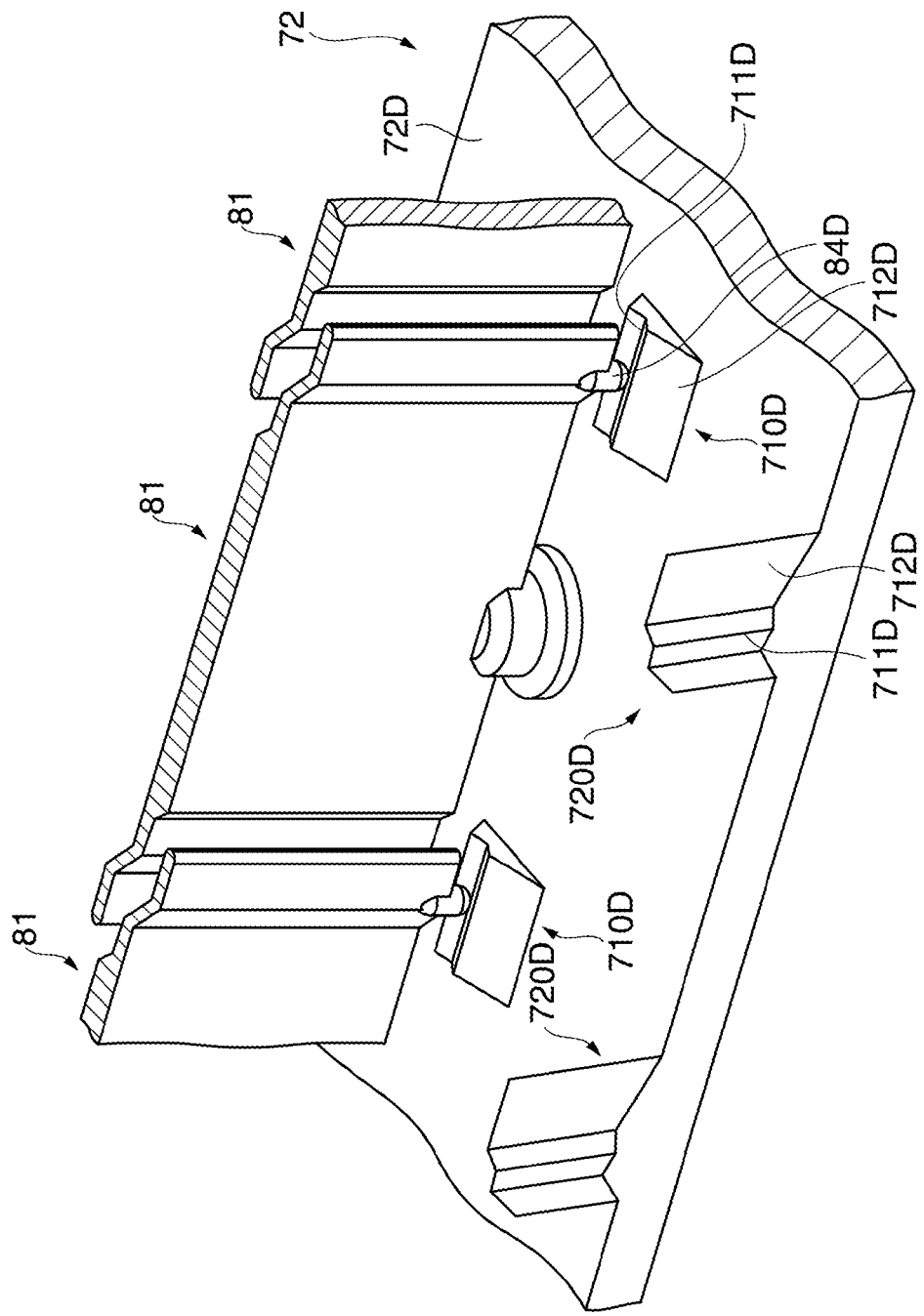
FIG. 17 is a diagram explaining the operation of the shutter apparatus in the second embodiment.

FIGS. 15 to 17 are diagrams explaining the operation of the shutter apparatus 6. Specifically, FIG. 15 shows a state in which the louver board 81 is in the open position, FIG. 16 shows a state in which the louver board 81 is in the intermediate position, and FIG. 17 shows a state in which the louver board 81 is in the close position.

In the open position, as shown in FIG. 15, the engaging section 84D is engaged in the concave section 711D of the second locking section 720D, and the louver board 81 is locked by the second locking section 720D. From this state, when the louver board 81 is rotated to the close position by making the solenoid 92B perform the restoring operation, the louver board 81 moves upward due to the play in the direction of the rotation axis A, and the engaging section 84D moves over the tip of the second locking section 720D and goes out of engagement with the concave section 711D.

Then, the engaging section 84D moves downs the inclined surface 712D of the second locking section 720D, and, as shown in FIG. 16, the louver board 81 moves to the intermediate position.

Furthermore, when the louver board 81 rotates to the close position, the engaging section 84D starts climbing the inclined surface 712D of the first locking section 710D. At this time, the louver board 81 moves upward due to the play in the direction of the rotation axis A. The engaging section 84D is engaged in the concave section 711D of the first locking section 710D when finishing climbing the inclined surface 712D, and the louver board 81 is locked by the first locking section 710D.

Incidentally, as described earlier, an engagement structure similar to that on the lower end side is also provided on the upper end side of the louver board 81. Therefore, the shutter apparatus 6 operates in a similar manner even when the projector 1 is turned upside down and is installed in a ceiling-hung position.

The second embodiment described above has the following effects.

When the louver board 81 rotates to the close position, the louver board 81 and the lower edge section 72 engage by the engagement structure (the engaging section 84D and the concave section 711D of the first locking section 710D). As a result, it is possible to prevent the sway of the louver board 81 in the close position and keep a closed state of the exhaust port 21.

Moreover, when the louver board 81 rotates to the open position, the louver board 81 and the lower edge section 72 also engage by the similar engagement structure (the engaging section 84D and the concave section 711D of the second locking section 720D). This makes it possible to prevent the sway of the louver board 81 in the open position. As a result, even when there is leak light from the exhaust port 21, it is possible to prevent the occurrence of flicker by preventing the fluctuation of the leak light.

Furthermore, since the engagement structure is provided in the edge side of the extending section 81B, the edge which is away from the rotation axis A, as compared to a case in which the engagement structure is provided in a position near the rotation axis A, it is possible to hold the louver board 81 with stability.

Moreover, since the engaging section 84D and the flat section 72D do not make contact with each other when the louver board 81 is rotating, it is possible to rotate the louver board 81 smoothly with a weak force.

In addition, the length L6 of the play in the direction of the rotation axis A of the louver board 81 is made greater than the distance L7 from the point of the engaging section 84D to the tip of the first locking section 710D in the intermediate position in the direction in which the engaging section 84D projects. This makes it possible to engage the engaging section 84D in the concave section 711D located at the tip of the first locking section 710D by moving the louver board 81 upward without causing deformation in the louver board 81.

Moreover, the gap L2 is smaller than the length which is the sum of the projection length L1 of the engaging section 84D and the length L3 from the point of the engaging section 84D to the flat section 72D in the close position. As a result, in the close position, the louver board 81 does not move all the way downward, and the bearing surface 702D of the lower edge section 72 and the bearing surface 813D of the louver board 81 are away from each other. That is, since the engaging section 84D is pressed against the concave section 711D and is engaged therein under the own weight of the louver board 81 in the close position, it is possible to keep a good engagement state without applying a load on the louver board 81.

Furthermore, since the louver board 81 and the lower edge section 72 have play in a stationary position, the louver board 81 moves downward under its own weight. As a result, in the close position, the sway of the louver board 81 is prevented by the engagement structure on the lower end side (the engaging section 84D and the first locking section 710D). Moreover, the length L4 from the point of the engaging section 84D to the point of the engaging section 84U is shorter than the length L5 from the tip of the first locking section 710D to the tip of the first locking section 710U. As a result, in the engagement structure on the upper end side (the engaging section 84U and the first locking section 710U), a gap is generated between the engaging section 84U and the first locking section 710U.

Incidentally, in a ceiling-hung position, the sway of the louver board 81 is prevented by the engaging section 84U and the first locking section 710U, and a gap is generated between the engaging section 84D and the first locking section 710D.

Therefore, since it is possible to prevent the sway of the louver board 81 by any one of the engagement structures, as compared to a case in which the sway of the louver board 81 is prevented by both engagement structures, it is possible to bring the engaging section 84D or the engaging section 84U into engagement or make the engaging section 84D or the engaging section 84U go out of engagement by a force which is not very great.

Moreover, in the close position, the engaging section 84D is pressed against the concave section 711D and is engaged therein under the own weight of the louver board 81. This makes it possible to keep a good engagement state without applying a load on the louver board 81.

Furthermore, when the projector 1 is installed in a stationary position, the louver board 81 moves downward under its own weight, and, in the close position, the sway of the louver board 81 is prevented by the engaging section 84D and the first locking section 710D. Moreover, since the length L4 from the point of the engaging section 84D to the point of the engaging section 84U is shorter than the length L5 from the tip of the first locking section 710D to the tip of the first locking section 710U, a gap is generated between the engaging section 84U and the first locking section 710U.

Incidentally, when the projector 1 is installed in a ceiling-hung position, the sway of the louver board 81 is prevented by the engaging section 84U and the first locking section 710U, and a gap is generated between the engaging section 84D and the first locking section 710D.

Therefore, since the sway of the louver board 81 can be prevented by any one of the engagement structures on both end sides of the rotation axis A, as compared to a case in which the sway of the louver board is prevented by the engagement structures on both end sides, it is possible to bring the engaging section 84D or the engaging section 84U into engagement and make the engaging section 84D or the engaging section 84U go out of engagement by a force which is not very great.

Moreover, since the louver board 81 is formed of the pair of extending sections 81A and 81B, the center of gravity of the louver board 81 is located on the rotation axis A. As a result, even when the position of the projector 1 is changed according to the angle of projection or the like, there is no possibility that the rotational position of the louver board 81 is moved from an intended position.

Furthermore, in the first locking section 710D, a portion with which the engaging section 84D makes contact is the inclined surface 712D. This makes it possible to reduce fluctuations in the load which is applied to the louver board 81 when the louver board 81 is rotating to the close position and rotate the louver board 81 smoothly.

Moreover, since the concave section 711D is formed into a groove shape extending while intersecting the trajectory of the engaging section 84D, the trajectory described when the louver board 81 is rotating, even if the louver board 81 and the frame member 7 are not produced precisely, the engaging section 84D can be engaged in the concave section 711D in the close position. This makes it easier to produce the projector 1.

In addition, since the end of the engaging section 84D is hemispherical, it is possible to reduce resistance to the inclined surface 712D and rotate the louver board 81 smoothly.

The effects in the close position have been described above; however, the same effects can be obtained in the open position.

It is to be understood that the invention is not limited in any way by the embodiments thereof described above, and, unless modifications and variations depart from the scope of the invention, they should be construed as being included therein.

In the embodiments described above, the configuration in which the cam plate 91 is moved by using the power of the solenoid 92B; however, the invention is not limited thereto. A configuration in which the cam plate 91 is operated manually may be adopted. Moreover, a configuration in which the cam plate 91 is moved by the power such as a motor other than the solenoid 92B may be adopted. As just described, since switching between open and close positions of the louver 8 can be performed under light load, it is possible to adopt various kinds of power.

In the embodiments described above, a self-holding solenoid that keeps a state after the sucking operation is adopted as the solenoid 92B; however, the type of solenoid 92B is not limited thereto. For example, a solenoid that is not a self-holding solenoid may be adopted, or a solenoid that also keeps a state after the restoring operation may be adopted. In the latter case, the elastic member 92A can be omitted.

In the embodiments described above, a configuration is adopted in which the louver 8 is brought into the open position by the sucking operation of the solenoid 92B and is brought into the close position by the restoring operation of the solenoid 92B; however, the invention is not limited thereto. A configuration may be adopted in which the louver 8 is brought into the close position by the sucking operation and is brought into the open position by the restoring operation.

In the embodiments described above, the exhaust port 21 is formed in the left wall section 2C of the outer housing 2; however, the exhaust port 21 may be formed in the front wall section 2A or the like. When the exhaust port 21 is formed in the front wall section 2A, by regulating the rotation of the louver board 81 in the open position in a direction in which the exhaust air moves away from the projection lens 3C, it is possible to prevent an image light projected from the projection lens 3C from flickering due to the exhaust heat.

In the embodiments described above, a case in which the number of louver boards 81 forming the louver 8 is eight has been illustrated; however, the number of louver boards 81 is not limited to a particular number and may be appropriately set according to the size etc. of the exhaust port 21.

In the second embodiment described above, the configuration in which the engaging section 84D having a projecting shape is engaged in the concave section 711D having the shape of a V groove has been described as an example; however, the engagement structure of the engaging section 84D and the locking sections 710D and 720D is not limited thereto. For example, the concave section 711D may be a U-shaped groove or the like. Moreover, the concave section 711D may be formed into a projecting shape, and the end of the engaging section 84D may be formed into a concave shape into which the projecting shape is fitted.

In the second embodiment described above, the engaging sections 84D and 84U are provided on the extending section 81B's-side of the louver board 81; however, the invention is not limited thereto. For example, the engaging sections 84D and 84U may be provided in both the extending sections 81A and 81B, or one of the engaging sections 84D and 84U may be provided in the extending section 81A and the other of the engaging sections 84D and 84U may be provided in the extending section 81B. In these cases, the first locking sections 710D and 710U, the second locking section 720D, and the like may be appropriately provided in positions corresponding to the close positions and open positions of the engaging sections 84D and 84U.

What is claimed is:

1. A projector comprising:
an outer housing having an exhaust port;
a louver board configured to rotate to an open position in which the louver board opens the exhaust port or to a close position in which the louver board closes the exhaust port; and
a drive mechanism configured to rotate the louver board, and includes a moving member configured to rotate the louver board to the open position or the close position by moving rectilinearly,
the louver board includes a projecting section configured to engage the moving member, and
the positions of the projecting section in the open position and in the close position are set so as to be located on opposite sides of a virtual plane which includes a rotation axis of the louver board and is perpendicular to a direction in which the moving member moves.

2. The projector according to claim 1, wherein
the positions of the projecting section in the open position and in the close position are set so as to be symmetric with respect to the virtual plane.

3. The projector according to claim 1, wherein
the drive mechanism includes a solenoid configured to operate the moving member.

4. The projector according to claim 3, wherein
the solenoid is formed as a self-holding solenoid configured to perform sucking operation for sucking a movable member and making the movable member stick to a fixed member by the passage of electric current through an exciting coil and then keeps a state in which the movable member is sucked and made to stick to the fixed member only by magnetomotive force of a permanent magnet.

5. The projector according to claim 4, wherein
the solenoid rotates the louver board to the open position with the sucking operation and rotates the louver board to the close position with a restoring operation that detaches the movable member from the fixed member by cancelling out the magnetomotive force of the permanent magnet by the passage of electric current through the exciting coil.

6. The projector according to claim 1, wherein
the louver board includes a pair of extending sections extending from the rotation axis in opposite directions and has a shape which is rotationally symmetric about the rotation axis.

7. A projector comprising:
an outer housing having an exhaust port;
a louver board configured to rotate about a rotation axis to an open position in which the louver board opens the exhaust port or to a close position in which the louver board closes the exhaust port;
a drive mechanism configured to operate the louver board;

a supporting member configured to pivotally support the louver board; and an engagement structure provided in the louver board and the supporting member, the engagement structure includes an engaging section formed in the louver board and a locking section formed in the supporting member, the engaging section and the locking section engaging in the close position.

8. The projector according to claim 7, wherein
the engagement structure includes the locking section so that the louver board and the supporting member engage also in the open position.

9. The projector according to claim 7, wherein
the louver board includes an extending section extending from the rotation axis, and
the engagement structure is provided in an edge side of the extending section.

10. The projector according to claim 7, wherein
the louver board includes an end section located at an end of the extending section in a vertical direction thereof,
the supporting member includes a flat section facing the end section with a gap between the flat section and the end section,
the engaging section projects from the end section to the flat section, and
the projection length of the engaging section is smaller than the gap.

11. The projector according to claim 10, wherein
the louver board is pivotally supported with play in a direction along the rotation axis,
the locking section is formed into a projecting shape projecting from the flat section to the engaging section and having a concave section configured to engage the engaging section at a tip thereof, and
the length of the play is greater than the distance from a point of the engaging section to the tip of the locking section in a direction in which the engaging section projects in a state in which the louver board has moved to a lower end.

12. The projector according to claim 10, wherein
the louver board is pivotally supported with play in a direction along the rotation axis,
the locking section is formed into a projecting shape projecting from the flat section to the engaging section and having a concave section configured to engage the engaging section at a tip thereof,
the gap is a gap between the end section and the flat section in a state in which the louver board has moved to a lower end, and
the gap is smaller than a length which is the sum of the projection length of the engaging section and a length from a point of the engaging section to the flat section in a locked position of the engaging section and the locking section.

13. The projector according to claim 12, wherein
the engaging section is provided at upper and lower ends of the end section,
the locking section is provided for each of the engaging sections, and
a length from a point of one engaging section to a point of the other engaging section is shorter than a length from a tip of one locking section to a tip of the other locking section.

14. The projector according to claim 7, wherein
the louver board includes a pair of extending sections extending from the rotation axis in opposite directions and has a shape which is rotationally symmetric about the rotation axis.

15. The projector according to claim 11, wherein
the locking section has an inclined surface in a portion with which the engaging section makes contact.

16. The projector according to claim 11, wherein
the concave section is formed into a groove shape extending while intersecting the trajectory of the engaging section, the trajectory described when the louver board is rotating.

* * * * *